(12) United States Patent
Loeb et al.

(10) Patent No.: US 10,728,338 B2
(45) Date of Patent: Jul. 28, 2020

(54) AUTOMATED PROFILING AND CONTEXT DEPENDENT COOPERATIVE IOT MANAGEMENT OPERATIONS

(71) Applicant: InterDigital Technology Corporation, Wilmington, DE (US)

(72) Inventors: Shoshana Loeb, Philadelphia, PA (US); Kuo-Chu Lee, Princeton Junction, NJ (US); Ralph Neff, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 18 days.

(21) Appl. No.: 15/574,551

(22) PCT Filed: May 18, 2016

(86) PCT No.: PCT/US2016/033074
§ 371 (c)(1),
(2) Date: Nov. 16, 2017

(87) PCT Pub. No.: WO2016/187298
PCT Pub. Date: Nov. 24, 2016

(65) Prior Publication Data
US 2018/0205793 A1 Jul. 19, 2018

Related U.S. Application Data

(60) Provisional application No. 62/163,181, filed on May 18, 2015.

(51) Int. Cl.
*H04L 29/08* (2006.01)
*H04W 4/70* (2018.01)
(Continued)

(52) U.S. Cl.
CPC ............ *H04L 67/12* (2013.01); *G06T 19/003* (2013.01); *H04W 4/70* (2018.02); *H04W 4/38* (2018.02)

(58) Field of Classification Search
CPC ..................................................... H04L 67/12
See application file for complete search history.

(56) References Cited

U.S. PATENT DOCUMENTS 6,057,856 A 5/2000 Miyashita et al.
2014/0361875 A1* 12/2014 O'Hagan ........... G06K 7/10227
340/8.1
(Continued)

FOREIGN PATENT DOCUMENTS

WO 15130426 9/2015
WO 16109487 7/2016

OTHER PUBLICATIONS

"Internet of things," https://en.wikipedia.org/wiki/Internet_of_things , Available at: https://web.archive.org/web/20150515081148/https://en.wikipedia.org/wiki/Internet_of_things (May 15, 2015).
(Continued)

*Primary Examiner* — Adnan M Mirza
(74) *Attorney, Agent, or Firm* — Volpe and Koenig, P.C.

(57) ABSTRACT

Methods and systems may be used automated profiling and context dependent cooperative Internet of Things (IoT) management operations. Sensor data may be received from a plurality of devices, arranged into states, and categorized to generate a plurality of behavior categories. State transitions of the sensor data may be detected to generate state transition events. Interdependencies between the states and the state transition events may be analyzed using sets of event pattern detection rules. Actionable event patterns (AEPs) may be created and run based at least on the states and the state transition events to detect combinations of behavior patterns. Control actions and/or alerts may be sent to devices/users based on the detected combinations of behavior pattern. An interdependency graph (IDG) may be generated and/or displayed to users to represent the inter-
(Continued)

dependencies between the states and the state transition events.

20 Claims, 12 Drawing Sheets

(51) Int. Cl.
  *G06T 19/00* (2011.01)
  *H04W 4/38* (2018.01)

(56) References Cited

U.S. PATENT DOCUMENTS

| | | |
|---|---|---|
| 2015/0019342 A1 | 1/2015 | Gupta |
| 2015/0019553 A1* | 1/2015 | Shaashua .............. H04W 4/70 707/737 |
| 2015/0019714 A1 | 1/2015 | Shaashua et al. |
| 2015/0358777 A1 | 12/2015 | Gupta |

OTHER PUBLICATIONS

Brinton et al., "MOOC performance prediction via clickstream data and social learning networks," 2015 IEEE Conference on Computer Communications (INFOCOM), Kowloon, pp. 2299-2307 (Apr. 2015).
Eposs, "EPoSS Call Recommendations for Horizon 2020 LEIT ICT Work Programme 2016/17," Version 5.0, (Jan. 14, 2015).
Koster et al, "Publish-Subscribe in the Constrained Application Protocol (CoAP) draft-koster-core-coap-pubsub-00," Network Working Group, Ericsson (Oct. 27, 2014).
Perera et al., "Context-aware Computing in the Internet of Things: A Survey on Internet of Things From Industrial Market Perspective," in IEEE Access, vol. 2, pp. 1660-1679 (Jan. 31, 2015).
Swan, "Sensor Mania! The Internet of Things, Wearable Computing, Objective Metrics, and the Quantified Self 2.0" J. Sensor and Actuator Networks, 1(3), 217-253 (2012).

* cited by examiner

US 10,728,338 B2

AUTOMATED PROFILING AND CONTEXT DEPENDENT COOPERATIVE IOT MANAGEMENT OPERATIONS

CROSS REFERENCE TO RELATED APPLICATIONS

This application is the U.S. National Stage, under 35 U.S.C. § 371, of International Application No. PCT/US2016/033074, filed May 18, 2016, which claims the benefit of U.S. Provisional Application No. 62/163,181, filed May 18, 2015, the contents of which are hereby incorporated by reference herein.

BACKGROUND

The proliferation of the "Internet of Things" (IoT) has enabled users and applications to communicate, control, and automate connected devices. Sensors and actuators may be used to improve quality of experience, peace of mind, and the cost of operations in smart home, office, building, or city environments. Since each IoT device may generate a large amount of data about users, devices, and environments, it may be challenging to analyze the data from multiple IoT sensors.

Various communication protocols and data model standards are under development to support the integration and management of IoT devices by multiple applications and services (e.g., smart energy management, fitness applications, and healthcare services). In addition, many sensor data fusion, visualization, event detection, and integrated management solutions have been proposed or are under investigation for improving user experiences, system efficiency, and reliability. Machine learning methods may be used for pattern acquisition. The patterns learned may be used to improve prediction accuracy.

As more IoT devices and applications are integrated, the increased interactions between user behavior, environment conditions, and applications may increase the complexities of IoT management operations and user interfaces. It may be a challenge to reliably provide useful control actions to actuators in real-time. It may also be difficult to track what actions are useful to end users for improving operations.

SUMMARY

Methods and systems may be used automated profiling and context dependent cooperative Internet of Things (IoT) management operations. Sensor data may be received from a plurality of devices, arranged into states, and categorized to generate a plurality of behavior categories. State transitions of the sensor data may be detected to generate state transition events. Interdependencies between the states and the state transition events may be analyzed using sets of event pattern detection rules. Actionable event patterns (AEPs) may be created and run based at least on the states and the state transition events to detect combinations of behavior patterns. Control actions and/or alerts may be sent to devices/users based on the detected combinations of behavior pattern. An interdependency graph (IDG) may be generated and/or displayed to users to represent the interdependencies between the states and the state transition events.

BRIEF DESCRIPTION OF THE DRAWINGS

A more detailed understanding may be had from the following description, given by way of example in conjunction with the accompanying drawings wherein.

DETAILED DESCRIPTION

Figure 1A:
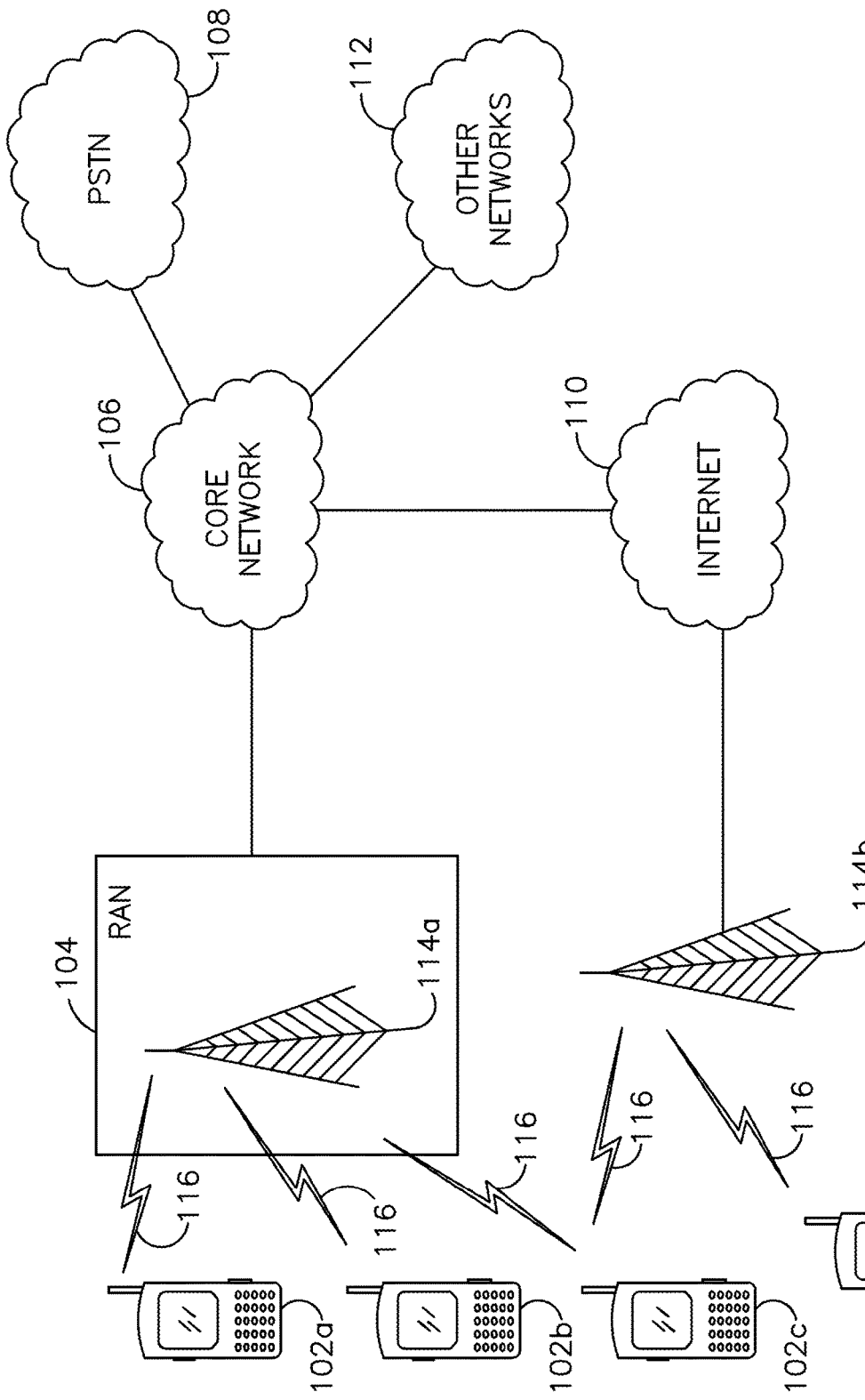
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, an Internet of Things (IoT) device, a user device in an IoT environment, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
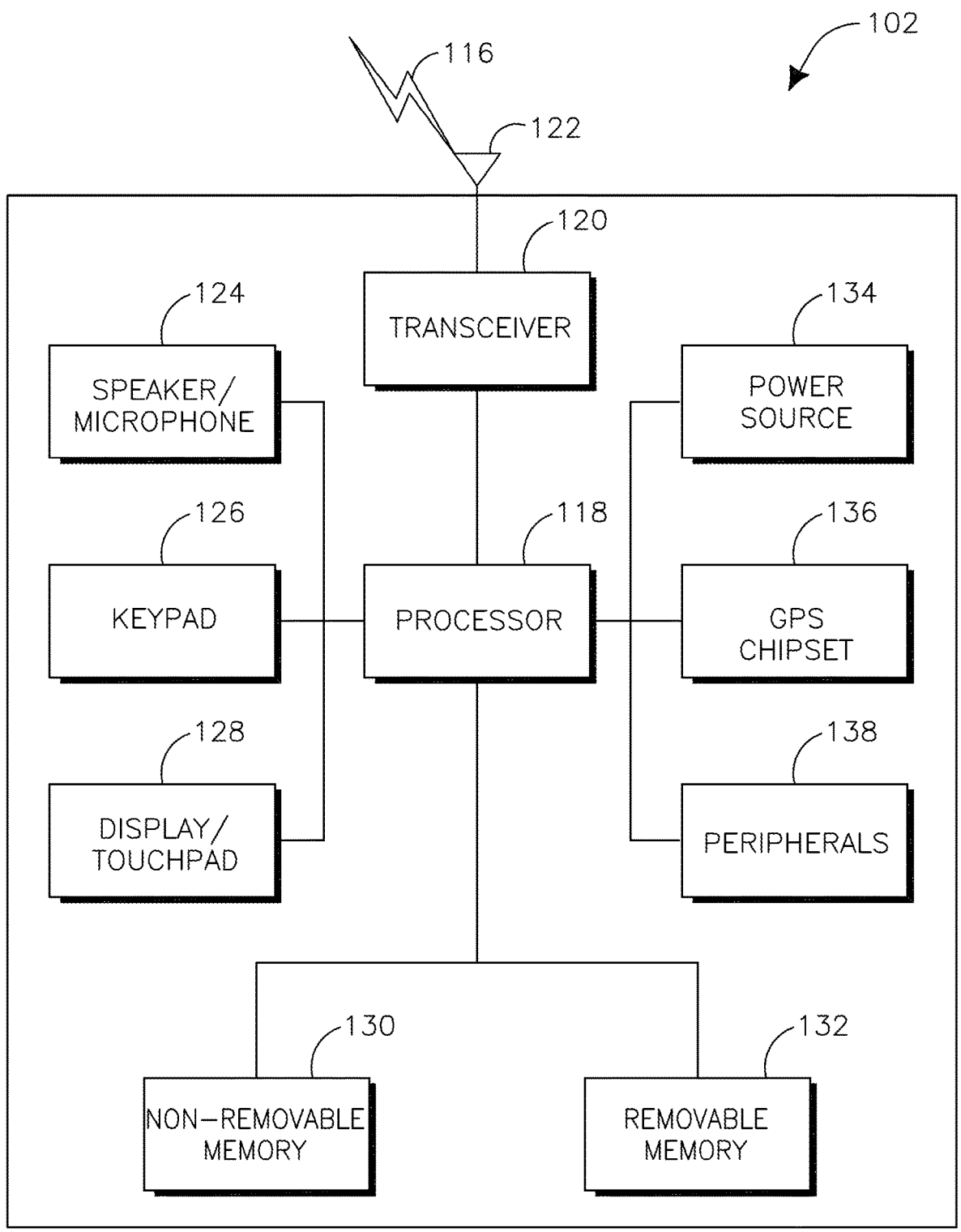
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
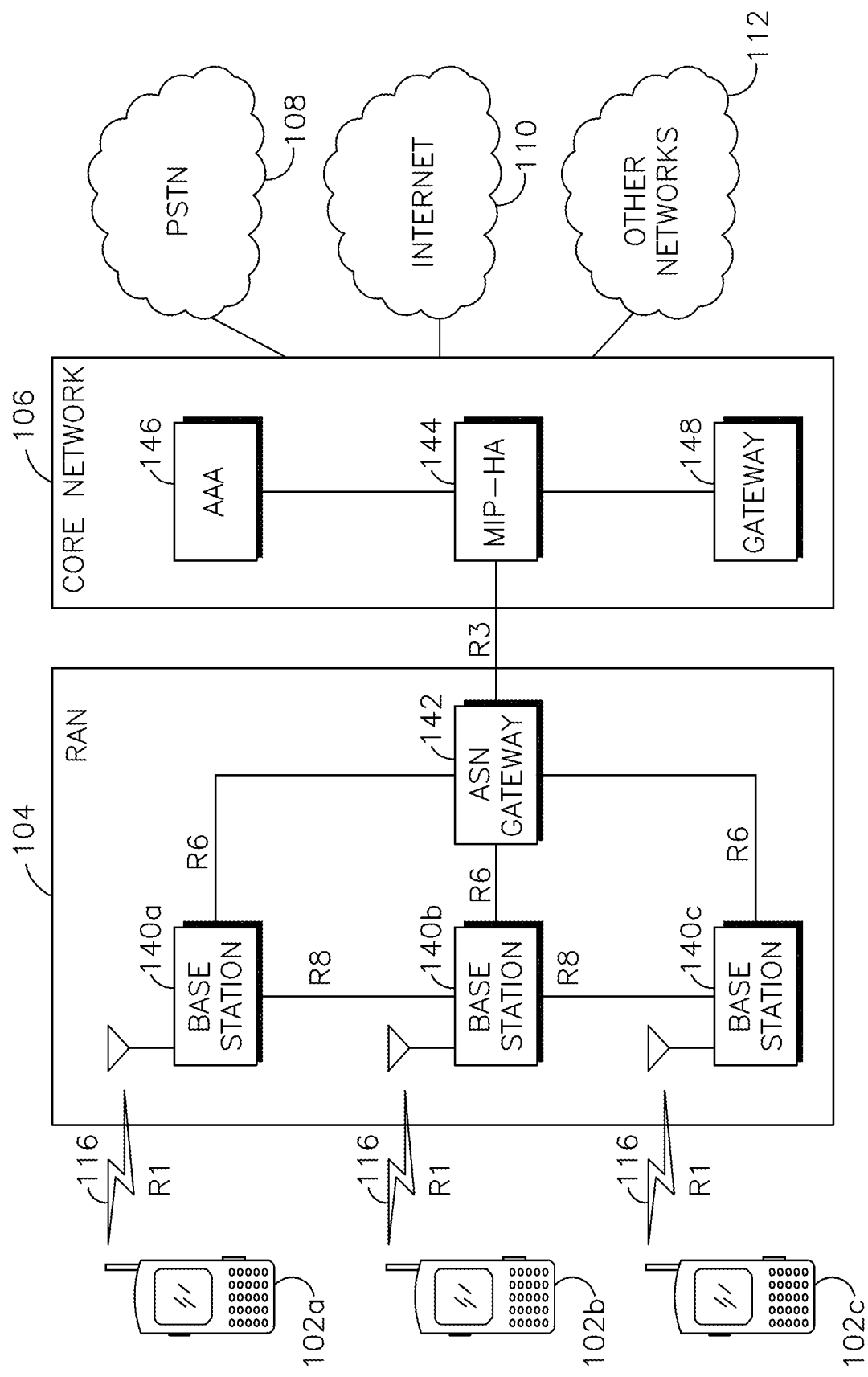
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 142 may be defined as an R6 reference point. The R6 reference point may include protocols for facilitating mobility management based on mobility events associated with each of the WTRUs 102a, 102b, 102c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA 144 may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 and the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Figure 1D:
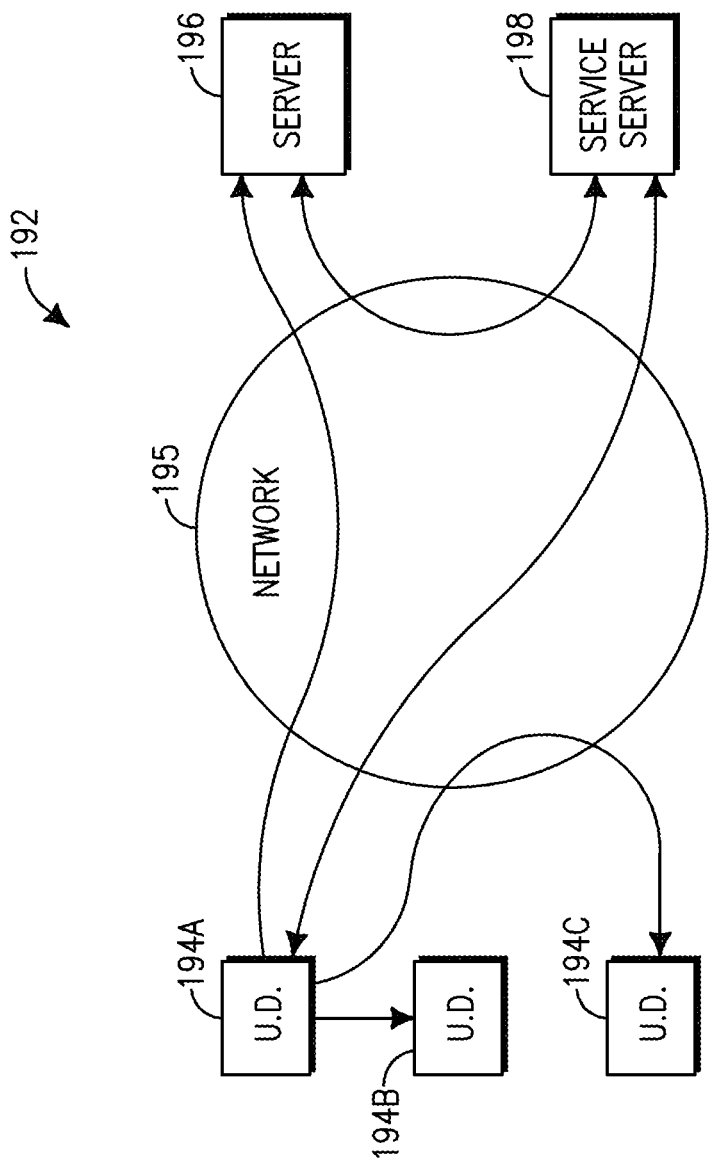
FIG. 1D is a system diagram of an example communications system in which one or more disclosed embodiments may be implemented.

FIG. 1D is a system diagram of an example communications system 175 in which the techniques described herein may be used. In some examples, communications system 175 may be implemented using all or a portion of system 100 as shown and described with respect to FIG. 1A.

User device 180a, server 185, and/or service server 190 may communicate over communications network 195. These communications may be wireless, wired, or any combination of wireless and wired. Communications network 195 may include the internet 110, core network 106, other networks 112, or any other suitable communications network or combination of communications networks.

User device 180a may include a WTRU (such as WTRU 102a), or any suitable user computing and/or communications device such as a desktop computer, web appliance, interactive television (ITV) device, gaming console (such as Microsoft XBOX™ or Sony Playstation™) or the like. User device 180a and/or applications executing on user device 180a may generate events such as mouse clicks, keyboard strokes, and the like. These events may be processed by user device 180a and/or may be transmitted to another device such as server 185 or service server 190. User device 180a may include a processor, a storage (such as a non-transitory computer readable memory or backing store), a receiver, and a transmitter.

Server 185 may include a web server, application server, data server, or any combination of these or other types of servers. Server 185 may include any suitable server device such as a server computer, personal computer, or the like. Server 185 may host applications accessible to user device 185a. For example, server 185 may include a gaming server hosting a massively multiplayer online game (MMOG), an email server, a web server hosting a website such as a social media website or blog, or other types of servers typically accessible by a user device over a computer communications network. Server 185 may include a processor, a storage (such as a non-transitory computer readable memory or backing store), a receiver, and a transmitter.

User device 180a may access server 185 over computer communications network 175 to interact with services that it provides. For example, user device 180a may access a game server hosted on server 185 to participate in a multiplayer online game. Access of server 185 by user device 180a may be via a client application executing on user device 180a or any other suitable mechanism. In some cases, the server 185 may receive events from user device 180a, or may send events to user device 180a. For example, the server 185 may send an event to user device 180a indicating that additional in-game resources are required for continued play.

Service server 190 may include a web server, application server, data server, or any combination of these or other types of servers hosted on a server device. Service server 190 may include any suitable server device such as a server computer, personal computer, or the like. Service server 190 may be configured to communicate with server 185, for example, over network 195 or any other suitable communications medium. Service server may be co-located with, combined with, or in direct communication with server 185. Service server 190 may include a processor, a storage (such as a non-transitory computer readable memory or backing store), a receiver, and a transmitter.

Service server 190 may communicate with server 185 to provide services, such as third party services, to users of server 185. For example, a subscriber to a game hosted on server 185 may access server 185 from user device 180A and may subscribe to third party services for the game which are hosted on service server 190.

Service server 190 may be configured to receive and/or intercept events transmitted between user device 180a and server 185. For example, in some embodiments server 185 and service server 190 may be configured such that server 185 may send an event destined for user device 180a instead or additionally to service server 190, and service server 190 may send the event or another event, signal, or message to device 180a. For instance, in a case where server 185 includes a game server, server 185 may send an event to service server 190 indicating a requirement of a user of user device 180a, and server 190 may send the event or another signal or message to device 180a indicating that a resource is available to acquire the requirement. In some embodiments, service server 190 may only forward the event to device 180a under certain conditions, such as based on a user preference and/or context information relating to the user of device 180a.

In some embodiments, the functions of service server 190 and server 185 may be implemented using the same device, or across a number of additional devices.

In some embodiments, user devices 180b and 180c may communicate with server 185 and/or service server 190 via user device 180a. For example, user device 180a may forward a notification message from service server 190 to user device 180b via a peer to peer connection and may forward a notification message from service server 190 to user device 180c via network 195. In some embodiments, user devices 180a, 180b, and 180c may form a network, such as a peer-to-peer network, and such network may have a mesh topology, a star topology using user device 180a as a coordinating node, or any other suitable topology. In such embodiments, the peer-to-peer network may operate independently of server 185 and/or service server 190, and may incorporate functionality that otherwise would be hosted by server 185 and/or service server 190, such as functionality described herein.

Everything that follows may, but is not required to be, employed and/or implemented using one or more, or part of one or more of the example systems discussed above.

Systems and methods are described herein to automate and improve Internet of Things (IoT) management operations and user interfaces for multiple applications and services. IoT systems may include or interact with user devices such as cell phones, PDAs, PCs, wearable devices Changes in user behavior and environment conditions may affect the efficiency of automated control processes and increase the complexity of manual operations. For example, multiple types of user and/or environment factors may affect energy management operations. Factors such as changes in weather conditions, a window left open, differences in insulation and distances to a heater, or an oven which generates heat, may affect the power consumption pattern. It may be difficult for users or automatic energy management systems to adjust and compensate for changes to account for all possible combinations of user and environment factors. Depending upon, for example, the location of the thermostat, insulation of each room, and air flow patterns, some rooms may be hot while others may not have enough heat. For example, a heater may be overloaded and become less effective or break-down.

User behavior and/or changes in the environment may impact multiple applications. For example, when a room temperature gets too hot, a user may open the window and forget to close it later. When a room has a window open, it may cause the heater to run continuously. When a user is engaging in intense exercises on treadmill or weight lifting, the user may lower the temperature setting, which may affect the temperature of other rooms. In some cases, turning the thermostat lower for rooms with poor insulation may save energy, in which case the door being closed may help to reduce inflow of hot air to make it more effective. As the number of combinations of user behaviors and environmental conditions increases, the complexity of interdependencies between these events and actions also increases.

An aspect of an IoT-based pervasive service environment is that sensors and actuators may be connected and shared by multiple applications. Vertical applications and services, such as smart thermostat with auto-learning (e.g., NEST), or smart thermostats that support pre-programmed temperature setting and heating cycle control may not support cooperative control and integration of sensor data (e.g., sensor data from other devices such as IoT devices) to provide integrated services and operations. Vital sign monitors incorporated in a smart watch or smart fabric may provide open interfaces for supporting multiple applications and services. In the future, more devices may support IoT communication protocols and service brokers.

To incorporate IoT sensors and actuators to monitor user behaviors and environmental conditions, applications and services may need to modify communication interfaces, processing logics, and/or user interfaces. However, it may be difficult for smart IoT devices and applications to modify and extend the interfaces and logics to accommodate the increased complexity caused by the diverse changing patterns of user behaviors and environment conditions. Furthermore, the applications and services may need to cooperate on the control actions to the existing actuators to achieve the desired results reliably and consistently. The complexities in integration of sensor data processing and cooperative control of actuators may impact the cost and time required to introduce new IoT applications and services.

Figure 2:
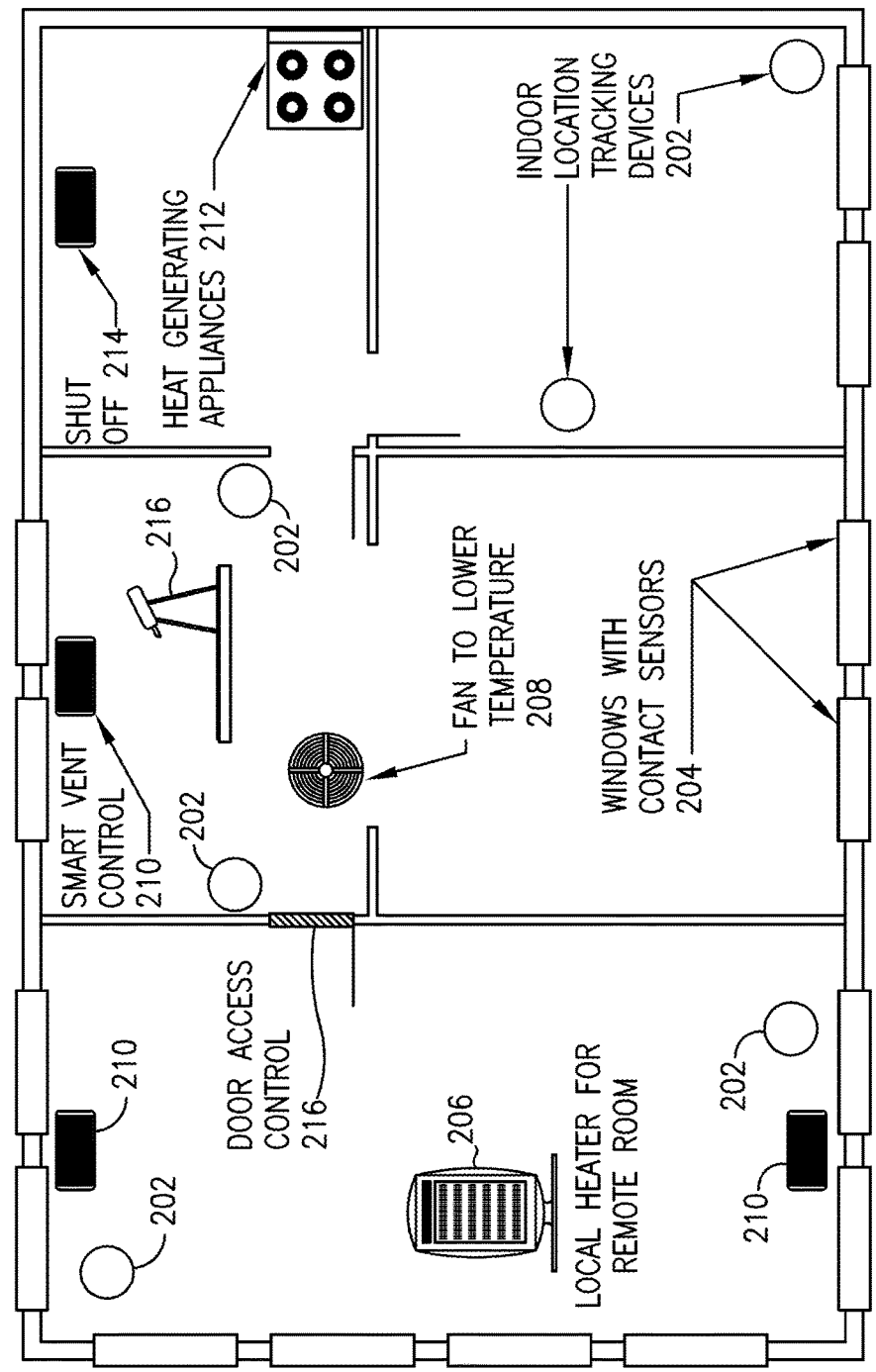
FIG. 2 is a diagram of an example advanced Internet of Things (IoT) environment containing multiple IoT devices, appliances, and applications.

An efficient IoT behavior profiling and cooperative control system may be used to reduce the complexity of IoT operations and improve the efficiency of IoT management operation and usability of user interface(s) in an IoT environment. For example, an advanced IoT environment may have multiple types of IoT sensors and actuators attached to appliances and devices (e.g., IoT devices) supporting multiple types of applications. For example, the sensors may be environment sensors. In addition, user devices such as wearable devices and smart phones may also collect user behavior data in parallel with the IoT sensors. Other examples of user devices include, but are not limited to, cell phones, PDAs, and personal computers (PCs). FIG. 2 is a diagram of an example advanced IoT environment 200 containing multiple IoT devices, appliances, and applications. The example advanced IoT environment 200 includes, but is not limited to include, any of the following IoT devices, appliances and applications: indoor location tracking device(s) 202; windows with contact sensor(s) 204 (similarly, doors can have contact sensors); local heater(s) for remote room(s) 206; fan(s) to lower temperature 208; smart vent control(s) 210; heat generating appliance(s) 212 such as a range; shut off vent control(s) 214; and/or fitness equipment such as a treadmill 216.

For example, indoor location tracking device(s) 202 may track and report the locations of objects, and may be built into IoT devices or user devices, or may be attached to other objects such as furniture in order to allow a central IoT behavior profiling and cooperative control system know how such objects are positioned within the building or within an individual room.

Figure 3:
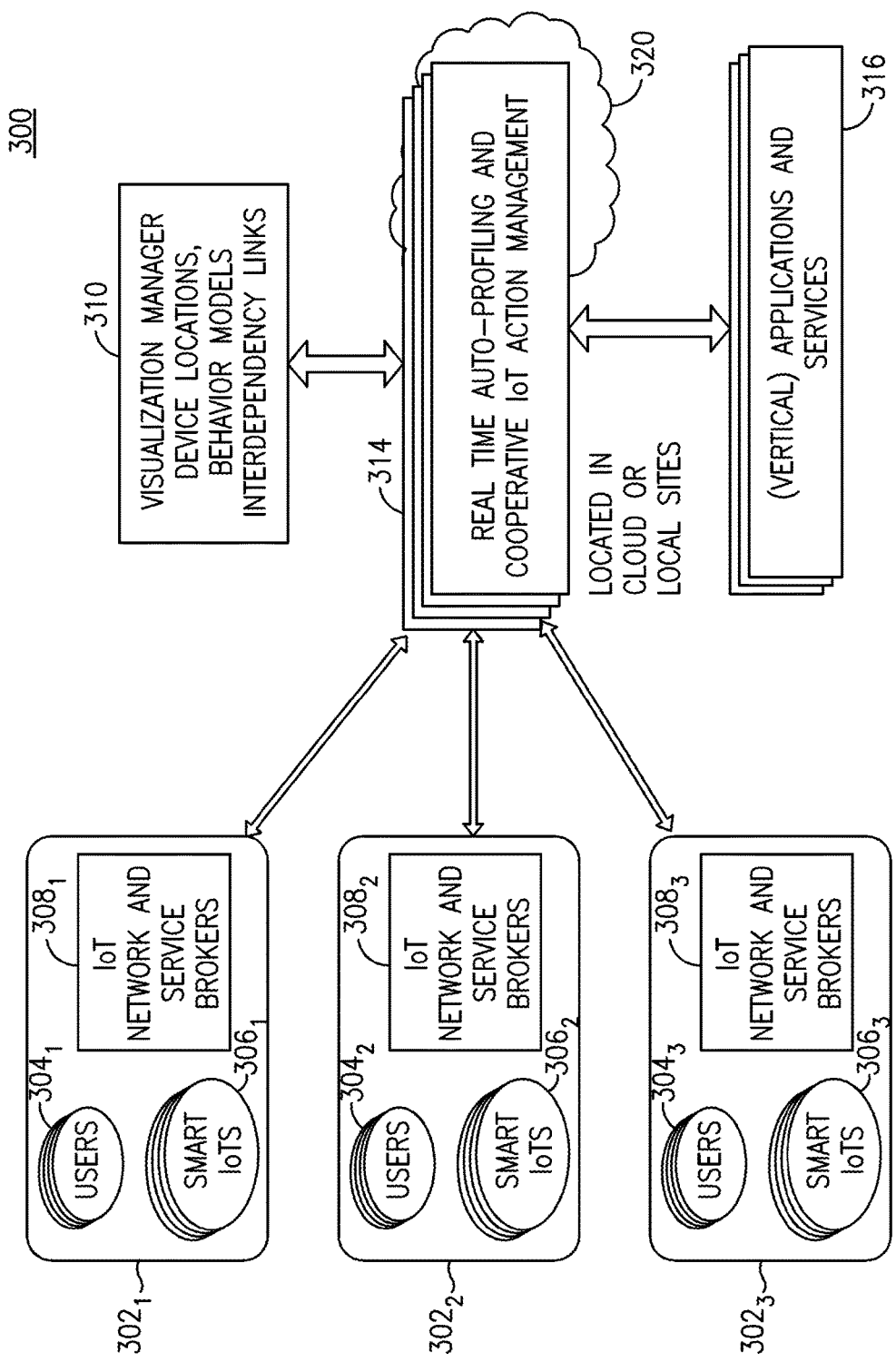
FIG. 3 is a system diagram of an example IoT system including an auto-profiling and cooperative IoT operation management system.

FIG. 3 is a system diagram of an example IoT system 300 including an auto-profiling and cooperative IoT operation management system 314. The example auto-profiling and cooperative action management system 314 may interact with IoT devices $306_1 \ldots 306_3$ and users (e.g., user devices) $304_1 \ldots 304_3$ distributed in multiple locations $302_1 \ldots 302_3$. For example, a location may be a home, an office, a hospital, an airport, or any location where users $304_1 \ldots 304_3$ may interact with IoT devices $306_1 \ldots 306_3$.

The example (real-time) auto-profiling and cooperative IoT action/operation management system 314 may reside in cloud servers 320 or local servers (not shown). A local server may, for example, reside in a personal computer, a router, an IoT gateway device, or a mobile device such as a mobile phone or tablet. Applications and services 316 may access the auto-profiling and cooperative IoT operation management system 314 through a set of Application Programming Interfaces (APIs) and/or Software Development Kits (SDKs), for example. The interface to the distributed IoT devices $306_1 \ldots 306_3$ and/or user devices $304_1 \ldots 304_3$ may be based on standard IoT networking and application layer protocols.

The auto-profiling and cooperative IoT operation management system 314 may subscribe to the IoT network and service brokers $3081 \ldots 3083$ to collect sensor data and/or configuration data from multiple IoT devices $306_1 \ldots 306_3$ and/or multiple user devices $304_1 \ldots 304_3$ in more than one location $302_1 \ldots 302_3$ in real-time. The auto-profiling and cooperative IoT operation management system 314 may connect to IoT devices $306_1 \ldots 306_3$ directly (e.g., via a direct wired or wireless connection, or via a local network) based on standard IoT network protocols, for example. Communication with user devices (users) $304_1 \ldots 304_3$ may be for example direct, via a local network, via a wide area network, or via a combination of networks, and may be determined based on the given location of the user devices $304_1 \ldots 304_3$ and the location of the server on which the auto-profiling and cooperative IoT operation management system 314 resides (e.g., whether the server is local or cloud-based 320).

The auto-profiling and cooperative IoT operation management system 314 may track and/or rank the behavior metrics of selected variables as well as interdependencies of events representing states, state transitions, and/or actions from multiple IoT devices $306_1 \ldots 306_3$ and users $304_1 \ldots 304_3$. The behavior metric(s) and the interdependency(ies) between events may be used by a set of automated actionable event pattern (AEP) processing logic to detect multiple combinations of behavior patterns to automate alerts to users $304_1 \ldots 304_3$ and/or control actions to IoT devices $306_1 \ldots 306_3$. The IoT system 300 may include a visualization manager 310 that may track and/or display the device/user location(s), behavior model(s) and/or interdependency link(s) of events between the IoT devices $306_1 \ldots 306_3$ and users $304_1 \ldots 304_3$. Display of the device/user location(s) $302_1 \ldots 302_3$ may be based on location information reported by the IoT devices $306_1 \ldots 306_3$, the user devices $304_1 \ldots 304_3$, and/or the indoor location tracking devices (e.g., tracking devices 202 in FIG. 2). The visualization manager 310 may be part of the auto-profiling and cooperative IoT operation management system 314.

Figure 4:
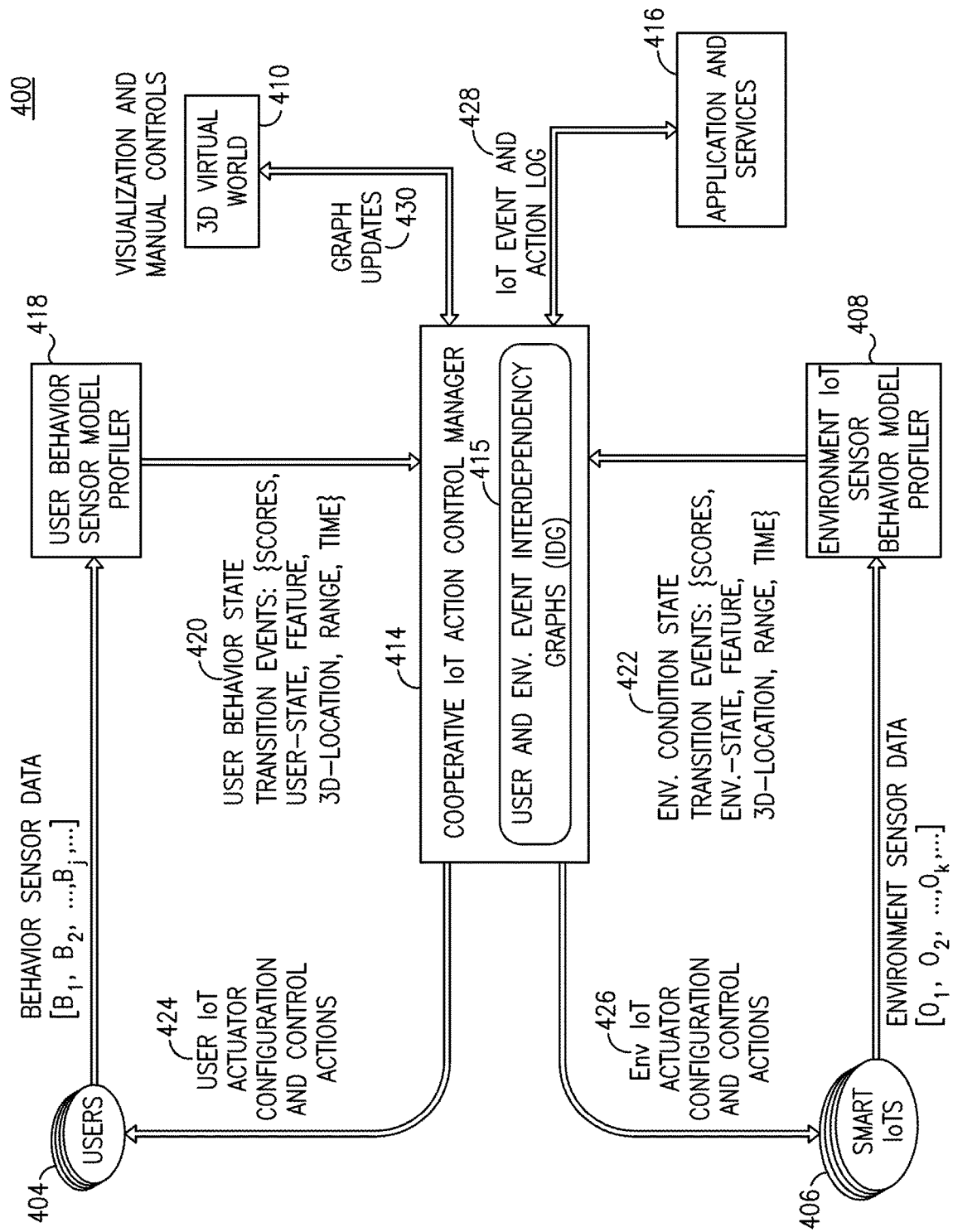
FIG. 4 is a system diagram of an example cooperative IoT action management system including functional interfaces.

FIG. 4 is a system diagram of an example cooperative IoT action (operation) management system 400 including functional interfaces. The cooperative IoT action management system 400 may include user behavior and environment condition profiling, behavior and condition interdependency analysis, and/or cooperative action control functions. For example, the cooperative IoT action management system 400 may include, but is not limited to include, any of the following modules and devices: user device(s) (users) 404; smart IoT device(s) 406; environment IoT sensor behavior model profiler 408; (three dimensional (3D)) virtualization/visualization controller 410; cooperative IoT action control manager 414; application(s) and service(s) 416; and/or user behavior sensor model profiler 418.

The environment IoT sensor behavior model profiler 408 may receive environment sensor data $[O_1, O_2, \ldots, O_j, \ldots]$ from the IoT devices 406. Similarly, the user behavior sensor model profiler 418 may receive behavior sensor data $[B_1, B_2, \ldots, B_j, \ldots]$ from the user devices 404. The environment IoT sensor behavior model profiler 408 and/or user behavior sensor model profiler 418 may filter and categorize environment sensor data and user behavior data, respectively, into multiple behavior categories. For example, each category may be represented by a state S and/or a feature vector (FV) that may describe a current condition and/or the cumulative statistical behaviors of the environment conditions and/or users 404.

In an example, an indoor temperature sensor in a smart IoT device 406 may produce temperature readings which may be communicated to environment IoT sensor behavior model profiler 408 as environment sensor data $[O_1, O_2, \ldots, O_j, \ldots]$. In one case, the environment IoT sensor behavior model profiler 408 may map such data into categories that represent fixed temperature ranges. For example, there may be ten categories $\{C_0 \ldots C_9\}$ that cover the range of expected indoor temperatures. $C_0$ may represent temperatures below 55° Fahrenheit; $C_1$ may represent temperatures from 55° Fahrenheit to less than 60° Fahrenheit; $C_2$ may represent temperatures from 60° Fahrenheit to less than 65° Fahrenheit; and so forth with $C_9$ representing temperatures at or above 95° Fahrenheit. The profiler 408 may map incoming temperature readings from IoT devices 406 into the appropriate categories $\{C_0 \ldots C_9\}$.

In another example, the profiler 408 may map temperature data into categories that may measure the difference in standard deviations from a mean temperature. For example, seven categories $\{C_{-3} \ldots C_0 \ldots C_{+3}\}$ may be defined such that: $C_0$ represents temperatures within 25 percent of one standard deviation of the mean temperature: $C_{-1}$ represents temperatures which are between 25 and 50 percent of one standard deviation below the mean; $C_{+1}$ represents temperatures which are between 25 and 50 percent of one standard deviation above the mean; and so on and so forth. In another example, the profiler 408 may map temperature data into categories that denote the relative stability or instability of the temperature. For example: category $C_0$ may represent a temperature that has not changed by more than 5° in the past hour; $C_1$ may represent a temperature that has changed by at least 5° but not more than 10° in the last hour; and $C_2$ may represent a temperature which has changed by 10° or more in the past hour.

The environment IoT sensor behavior model profiler 408 and/or user behavior sensor model profiler 418 may categorize any incoming data from user devices (or users) 404 and/or smart IoT devices 406 according to categories defined within the profilers 408 and 418. A data type or data point may contribute to multiple categorizations. For example, an incoming temperature value may be categorized according to absolute temperature, and according to stability of temperature, and these multiple categorizations may be used within a profiler 408/418 and/or may be made available for further processing by the cooperative IoT action manager 414.

The environment IoT sensor behavior model profiler 408 and/or user behavior sensor model profiler 418 may rank each input event within each category. The environment IoT sensor behavior model profiler 408 and/or user behavior sensor model profiler 418 may identify environment condition state transition events 422 and/or user behavior state transition events 420, respectively, which may consist of spatial information (e.g., 3D location, geometry, and effective range) and/or temporal information (e.g., timestamp, delay, and inactivity intervals) about the place and time the state transition occurs. An event 422/420 generated by the environment IoT sensor behavior model profiler 408 and/or user behavior sensor model profiler 418 may signify a state transition as well as a periodic sampling of the cumulative duration and rate of change within a state and category. The environment IoT sensor behavior model profiler 408 and/or user behavior sensor model profiler 418 may provide the environment condition state transition events 422 and/or user behavior state transition events 420 to the cooperative IoT action control manager 414. For example, a state transition event may occur when incoming user behavior sensor data $[B_1, B_2, \ldots, B_j, \ldots]$ or environment sensor data $[O_1, O_2, \ldots, O_j, \ldots]$ indicates a transition from one category to another category (e.g., when categorized temperature data transitions from category $C_0$ to category $C_1$).

The cooperative IoT action control manager 414 may use multiple sets of event pattern detection rules to analyze the interdependency between the state transition events (e.g., interdependency between state transition events corresponding to data from different devices that may be user devices 404 and/or IoT devices 406) and may generate interdependency graphs (IDGs) 415, which may include user and/or environment event IDGs. The IDGs 415 may consist of nodes representing the states and/or state transitions, and links between nodes representing the interdependency relationships (e.g. relationships between states and/or state transitions). The links may represent interdependency relationships (interdependencies) including, but not limited to, the following interdependency relationships: occurrence; intensity; causality; and/or delay.

The cooperative IoT action control manager 414 may use different sets of templates to create and run multiple actionable event patterns (AEPs). The AEPs can be predicated on the events 420/422 that represent the state, state transitions, and/or user actions. The states may be defined by or based on variables (e.g., behavior sensor data $[B_1, B_2, \ldots, B_j, \ldots]$ and/or environment sensor data $[O_1, O_2, \ldots, O_j, \ldots]$) as obtained from user devices 404 and/or IoT devices 406), or statistical metrics derived from the variables. When a predefined AEP is triggered, the cooperative IoT action (control) manager 414 may send user IoT actuator configuration and control actions 424 to users 404, environment IoT actuator configuration and control actions 426 to IoTs 406, and/or IoT event and action log(s) 428 to applications and services 416. A virtualization/visualization controller 410 may use graph updates 430 to visually display user and environment interdependencies, for example using 3D visualization, which may be viewed by users and/or applications.

Users or applications may visualize the propagation of actions and changes in states and links dynamically in a graphical user interface (GUI). The GUI may overlay the nodes and may link information extracted from the IDG(s) on the devices and the links between the devices in the same display. (e.g., FIG. 7, described below, illustrates how the information associated with an IDG may be presented visually, and displayed in a GUI). New user actions or state changes in a device may trigger multiple state changes or user actions on other devices. These interdependent changes may be displayed on the GUI. In an example, users of the GUI may click on a state of a device or a link between devices to display detailed information extracted from the IDG(s). In another example, a user may modify the application specific triggering criteria of cooperative actions specified in AEP(s).

In an example, automated profiling and cooperative control flow may include the use of AEP processing. An AEP may collect user behaviors, such as vital signs, locations, and time information. The AEP may perform, but is not limited to perform, any of the following functions: profiling of user behavior data; interdependency analysis; coordination of the control of remote IoT actuators (e.g., by sending control messages to actuators in response to detecting a pattern of data or a pattern of interdependency between data, states, and/or state transitions); and/or sending of alerts to external users and systems (e.g., in response to identifying interdependency relationships between data, states, and/or state transitions).

Figure 5:
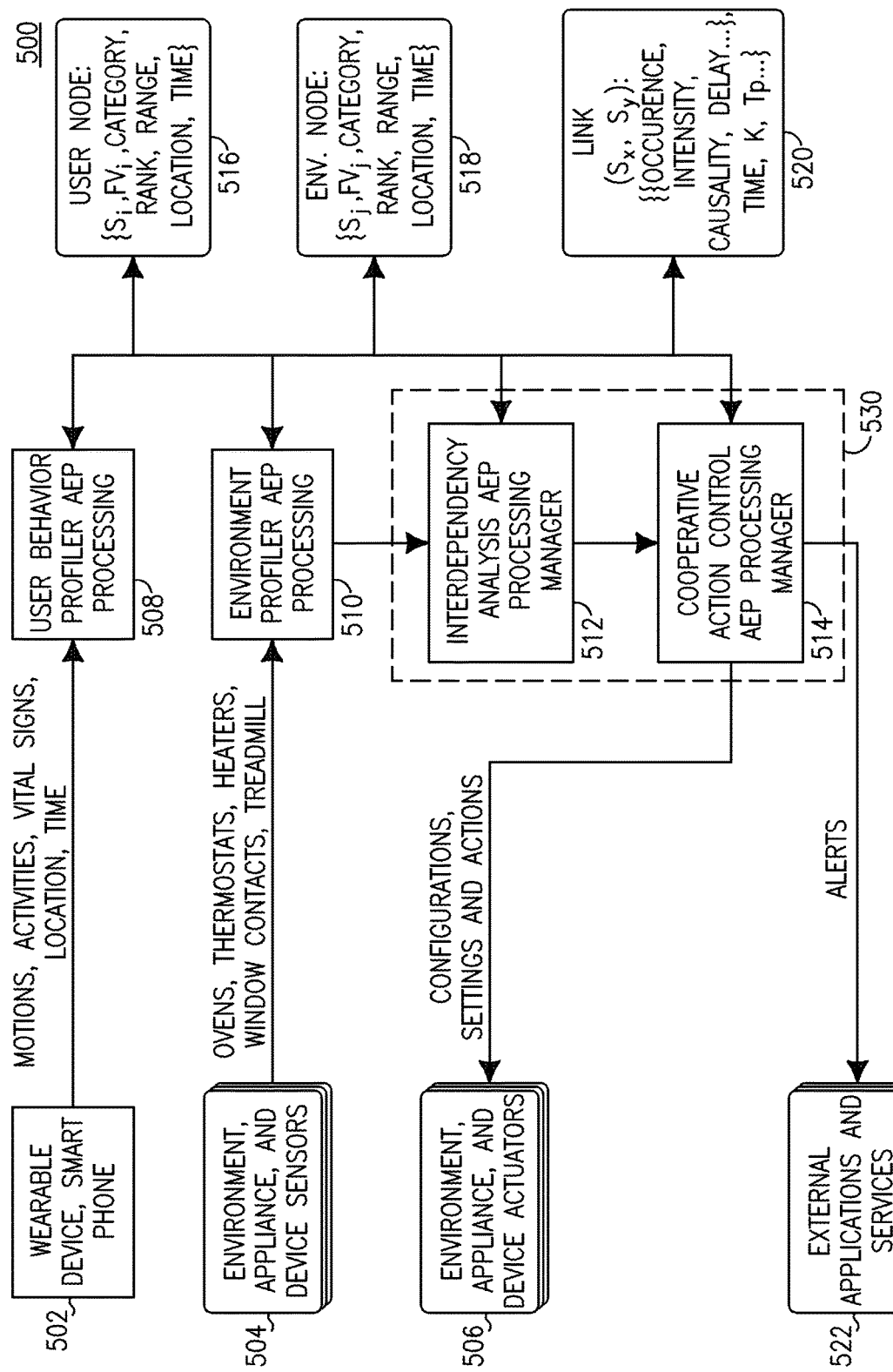
FIG. 5 is a system diagram of an example profiling and action control manager system employing actionable event pattern (AEP) processing.

FIG. 5 is a system diagram of an example profiling and action control manager system 500 employing AEP processing. The profiling and action control manager system 500 may include user node 516, environment node 518, and link 520. User node 516 and environment node 518 may represent processed data structures that may be created based on processing by user behavior profiler 508, environment profiler 510, interdependency analysis AEP processing manager 512, and/or cooperative action control processing manager 514. User node 516 and environment node 518 may be stored in a database for later retrieval and processing by such by user behavior profiler 508, environment profiler 510, interdependency analysis AEP processing manager 512, and/or cooperative action control processing manager 514. The user node 516 and environment node 518 data structures may represent event data that has been classified, categorized, and/or ranked. Nodes 516 and 518 may correspond to nodes in an IDG.

Link records 520 may be data structures generated based on interdependency analysis as performed by interdependency analysis AEP processing manager 512. Link records 520 may indicate or track interdependency relationships between data, states (e.g., categorized data), and/or state transitions. The link records 520 may indicate interdependency between data, states, and/or transitions corresponding to different devices (e.g., user devices 502 and/or IoT sensor devices 504). Link records 520 may indicate an interdependency type such as occurrence, intensity, causality, and/or delay. Link records 520 may correspond to links in an IDG. Link records 520 may be used to populate an IDG, or to generate visual indications of interdependency relationships for display in a user interface (not shown). Link records 520 may be stored in a database for later retrieval and processing.

The profiling and action control manager system 500 may include environment, appliance and device actuators 506, which may include any controllable actions or settings associated with IoT devices 504 (e.g., send a signal to set a smart thermostat to 74°, or send a signal to turn off smart lighting in a particular room). The profiling and action control manager system 500 may include external apps and services 522.

AEP processing management 530 may include interdependency analysis AEP processing manager 512 and/or cooperative action control AEP processing manager 514, and may support multiple types of sensors (e.g., IoT device sensors) 504 and or/devices (e.g., user devices) 502, including environment, appliance and/or device sensors 504 and wearable devices or smart phones 502. The user devices 502 may provide information to the user behavior profiler 508 (with AEP processing) including, but not limited to, any of the following information: motions of a device or its user; activities of the device or its user; vital signs of a user; location of the device or its user; and/or time. The environment sensors 504 may provide information to the environment profiler 510 (with AEP processing), including, but not limited to, any of the following information: the state of an oven, which may include data such as internal temperature, current temperature setting, and/or oven door state as open/closed; the state of a thermostat, which may include data such as a current temperature, a temperature setting, a state of operation (e.g., heating/cooling/off), and/or a current duty cycle for an attached heating or cooling device; the state of a heater or air conditioning device; the state of contact sensors for a window or door (open/closed); and/or fitness equipment information.

Events from different devices 502 and/or sensors 504 may be processed by either the user behavior profiler 508 and/or the environment profiler 510. In an example, such events may be generated by a sensor-equipped IoT device or user device 502, and event data may be sent by the device 502 and/or 504 to the appropriate profiler 508 and/or 510. Each event data may contain descriptive parameters such as: the sensor identification (ID); sensor type; sensor or device state; feature vectors; location; effective range; and/or time. In an example, to support multiple types of sensors and feature vectors $FV_i$, a simplified hierarchical data model may map the input event into states, categories, and/or ranks as follows: State Set is $\{S_1, S_2, \ldots, S_i, \ldots\}$, where state Si may be defined as {State_ID: "Identifier"; Status: [On|Off|Error, ...]; $FV_i$: $\{FV_i(1), \ldots, FV_i(j), \ldots\}$}. A state Si may include the related feature vectors $FV_i$, or the feature vectors may be maintained separately but still in association to the state $S_i$.

In an example, each sensor or actuator may have a different number of states $S_i$. Each state, $S_i$, may have a different number of feature vectors $FV_i(j)$ that may represent the sensor measurements and/or actuator status. The feature vector $FV_i$ corresponding to each state $S_i$ may be analyzed to produce application specific statistical models. For example, a default model may be a normal distribution model with average and standard deviation (STD) for each feature vector type collected from sensor devices of the same type under similar user behavior, application contexts, and/or environment conditions (e.g., activities, time of the day, location, temperature, and/or humidity). For example, state $S_i$ may be defined as $S_i$: {stateID, FV:{avg:[FV(1), ..., FV(i), ...], std:[FV(1), ..., FV(i), ...]}, user_behavior, application_context, environment_condition}.

IoT devices may use multiple dimensional feature vectors, such as temperature, on-duration, and/or power consumption rate, such that each dimension may be directly mapped to one of K categories $C_k$, where k=−K to K. The value of K may have a default value, for example the default value of K may be 10. In an example, an air conditioner may report an on-duration feature that represents the percentage of time that the device is on (e.g., computed over a defined sample period). Using K=10, the on-duration feature for the air-conditioner setting may be divided into 21 categories: $C_k$=average(FV_name: "on-duration")+k*10% std(FV(i)), where k=−10 to +10. In this case, the categories $C_k$ may indicate that the on-duration of the air conditioner is above or below the average on-duration by a multiple of 10 percent of one standard deviation.

A profiler may map each FV event into a category and rank within the categories defined by, {State_ID, $C_k$, Rank_Scores}. A Rank_Score may be a percentile ranking of the FV as compared to other FVs in the same category. For example, a Rank_Score may be used to find the maximal FV within a selected category.

An example scenario for use of auto-profiling and cooperative IoT operation management system, as described herein, may include automatic energy management, which is described further below. In this example, a profiler may be used to analyze air-conditioner application FV mapping categories (e.g., "on-duration") in a specific state (e.g., heat). The inputs FV and feature "on_duration" may be mapped into corresponding categories $C_k$ and the rank_score of the FV in the category $C_k$ may be calculated. All the window contact sensor FV mapping categories may be analyzed (e.g., "open-duration", which may represent the average percentage of time that the window is open as measured over some time period). The states (e.g., open, close, or error) of all the window contact sensors may be detected. The "thermostat temperature setting" mapping categories may be analyzed, and each "thermostat temperature setting" may be mapped to a category. State, category, and/or other change events to system modules (e.g., interdependency analysis modules) may be logged and/or notified to the user.

In the example scenario of automatic energy management, context aware data management may be used. The changes in FV category for each state and environment conditions (e.g., time of the day and location, room occupancy, and outdoor temperature) may be tracked. Events and the mapped categories may be stored in persistent memory to support fast access by the profiler(s), the interdependency analysis module(s) and other function components. Interdependency graph management may define spatial temporal AEP processing logic to generate interdependency graphs for multiple types of applications. For each predefined sample interval or when the interdependency graph management receives an event from a profiler, the AEP rules may update the parameters in the corresponding nodes and links to track the interdependency relationships. Examples of interdependency relationships include, but are not limited to: occurrence; intensity; causality; and/or delay.

For example, an occurrence-based interdependency relationship may represent that a first state (e.g., of a first sensor or device) may be likely to occur at the same or at a similar time as a second state (e.g., of a second sensor or device), or that the occurrence of the first state is correlated with the occurrence of the second state. In another example, an intensity-based interdependency relation may represent that a first state (e.g., of a first sensor or device) may be likely to have a value or intensity which is correlated with a value or intensity of a second state (e.g., of a second sensor or device), or that the intensities of two states may be correlated. In another example, a causality-based interdependency relation may represent that a first state (e.g., of a first sensor or device) may be likely to occur before a second state (e.g., of a second sensor or device). In another example, a delay-based interdependency relationship may represent that when a first state (e.g., of a first sensor or device) occurs, then a second state (e.g., of a second sensor or device) may be likely to occur after some expected, estimated or known delay period relative to the occurrence of the first state. In this case, the auto-profiling and cooperative IoT operation management system may automatically track the interdependency relationships using predefined statistical methods. The auto-profiling and cooperative IoT operation management system may support application provided customized statistical methods. The following are examples of default statistical methods that may be used to track interdependencies. In a first example, for each input node, NodeX, a set of Nodes in the IDG may be selected, where the timestamps of the selected Nodes may be within a time span defined by NodeX, and the distance may be within the range defined by NodeX.

In another example, the model and rank for each type of interdependency between NodeX and all the selected Nodes and Links may be updated. For an occurrence dependency, any of the following actions may occur: an occurrence statistical model for NodeX may be computed (e.g., a distribution model of moving averages of occurrence counts in a specific time window of all the links from the reference NodeX); the occurrence rank of each link based on the model may be computed (e.g., map the occurrence count of a link to a percentile rank based on the distribution model); and/or the ranks in the links between NodeX and the selected Nodes may be updated.

For causality and/or delay models/dependencies, any of the following actions may occur: a distribution model may be computed (e.g., distribution model of moving averages of the time delays between NodeX and all the selected Nodes); and/or using the computed distribution model, the causality and/or delay percentile rankings of all the selected links from NodeX may be computed and updated. For the intensity model/dependency, any of the following actions may occur: the moving average of the FVs may be tracked; the linear correlation model between the FVs of NodeX and the selected Nodes may be calculated; and/or the correlations for each link may be ranked.

When there are no interdependent transition events detected, only the node parameters of the first transitional event may be updated. The interdependency variables may be tracked as statistical variables with total counts, average, standard deviations, and/or other application specific properties such that the values may be normalized (e.g., normalized to [−1 to 1]) for multiple types of analysis functions, including for example ranking among a set of nodes or links.

In an example, IDG management may rank the interdependency for each state transition link and/or the total occurrence of each state based on time (e.g., how often a state occurs per hour, day, week, and/or month), and/or based on location (e.g., how often the state occurs in each location of one or multiple different tracked locations). The interdependency ranking of links may provide the priority for user alerts and automated remedial actions. The interdependency ranking may reduce the search space for external applications to access the relevant information stored in the node of the graph (e.g., Scores, States, and FVs) to implement application specific calculations, visualization, and/or optimization functions.

In an example, the IDG may be reduced to improve efficiency. Based on any constraints on interdependency rankings (e.g., keep links with top ten ranked occurrence, intensity, causality, and/or delay interdependencies within a time window of, for example, 1 month) and/or configurations on the effective distance, location, and range parameter settings, an IDG pruning process may be achieved such that low ranking links and/or nodes from the IDG may be deleted. States and categories of different sensors that have little or no interdependency with other sensors or users under the constraints of time, location and/or environment conditions may be archived and/or deleted. This pruning process may reduce the state space complexity of IoT operations in order to support faster response and efficient operation for distributed IoT management operations.

In an example, cooperative action control AEP processing for multiple applications may be used to alert a user of the detection of new and/or increasing event/interdependency occurrences. For example, an AEP may specify that if the "on-duration" of an air-conditioner increases by two categories, then take action to alert the users. The users alerted may include, but are not limited to, any of the following users: users associated with the air conditioner (e.g., an owner or maintainer of the air conditioner); users with nodes and links related to the air-conditioner state or environment condition; and/or users in the proximity of the air conditioner.

In another example, if a window "open-duration" category transition has occurred, an event notification may be sent to the user or users. Additionally, cooperative action control AEP processing for multiple applications may be used to activate remedial actions including sending an alert message to a user based on interdependency relationships with or between IoT sensor data from different applications (e.g., fitness and energy management). For example, a fitness application may provide exercise intensity events (e.g., high or low intensity) to the profiler. The thermostat may send an indication of one or more temperature adjustment events (e.g., adjusting temperature down to 60°) to the profiler. The auto-profiling and cooperative IoT operation management system may track the interdependency between the two types of events (e.g., intensive exercise and adjusting temperature down) in the IDG. After the event interdependencies are detected multiple times (e.g., two times, five times, or ten times) and tracked in the IDG for a period of time, the interdependency models may be ready to be used for real-time detection and remedial actions. When a new high intensity exercise event pattern is detected, the thermostat setting node (e.g., with temperature setting of, for example, 60°) may be selected from the IDG. Then, an alert message may be sent to the user to remind the user to adjust the thermostat setting to 60°. The AEPs that detect the high intensity exercise events may also detect if a "temperature setting event" has not occurred within a time window and, may (automatically) lower the temperature setting, for example by one category. Remedial action such as lowering the temperature automatically may be specified in the AEP rule configuration template and may be tracked in the persistent logs accessible users and/or operators.

In an example, a set of SDKs may be provided in order to extend the IoT standard application protocols to support rapid development of AEP for auto-profiling and cooperative action control. Such SDKs may be provided to the developer or manufacturer of IoT devices or user devices, and may be integrated into such devices in order to provide the SDK functionalities described herein. SDKs may include, but are not limited to include, any of the following set of functions and parameters: Create; Read; Update; and/or Delete (collectively referred to as CRUD node class definition template).

In an example of an SDK, a Node definition template may be defined to include, but not limited to include, the following attributes:

```
Node:
{
    IoT source ID,
    Time,
    Location,  // (e.g., zone ID and/or geographical (geo) location)
    StateName,
    StateID,
    Feature vector //(e.g., FV of the state)
    Score,
    Category,
    DS:    //(i.e. Descriptor)
    {Action: {{UserID, UserAction} | {DeviceID, DeviceAction,} |
    {
```

-continued

```
       AppID, AppAction}},
       StateTransition: {TotalTransitionCount, PreviousStateList:
       {StateID, PreviviousStateCount}}
       LocationRange,   //(i.e. the radius based on geo code or zone
definition)
       TimeSpan,   //(e.g., the max and min time of interdependency
window)
       /*The following attributes are defined for the distribution model
       and interdependency type, value and rank.*/
       ModelType,
       ModelDescription,
       DefaultModelParameters, //(e.g., moving average, standard
       deviation,
              time windows)
       /*The following attributes are defined for the data structure
supporting links to interdependent nodes*/
       LinkedNodeList*, //(i.e. a reference to a list of linked nodes)
       Link {LinkID, {SourceNodeID, LinkedNodeID,
           {Interdependency-type, value, rank},  //(i.e. default
       attributes)
           {AppDataType, {values}}, //(i.e. application data types
       and values)
           }
    }
```

For the Node definition above, the set of actions may include information about: the UserAction, (e.g., User sets thermostat temperature); DeviceAction (e.g., Heater turned on); and/or action from an energy management application (e.g., turn off air-conditioner). The link attribute may be included for each link. In an example of application specific link status monitoring, the IDG may support access to the link information for an application specific AEP to detect special patterns on default and/or application defined values or ranks from links between two pairs of specific IoT devices or users, and to retrieve the link information. After retrieval of the link information and the default and/or application defined data, application specific functions may be added to invoke user alerts and/or automatic remedial actions.

In another example of an SDK, event notification registration to receive the state transition and periodic state sampling events may be defined. For example, the SDK in a user device or an IoT device may send a message to the central system that may inform the central system of an event and/or parameters from the application that are available for the SDK to provide to the central system upon request. When requesting or subscribing to the event and/or the parameters, the central system may send a message to the SDK, which may include configuration data. The configuration data may include, but is not limited to include, any of the following attributes: IoT source ID; IoT variable list; sampling interval; default model, such as average and standard deviation of the variables; application specific statistical model service entry point; activation time and expiration time; and/or application service endpoints.

In another example of SDKs, functions or API calls may be defined to retrieve the top ranked links and associated nodes given a node ID. For example the following SDK may be defined to get a list of the N top ranked links based on Type and NodeID:

```
       GetRankedLinks(NodeID, Type=[Occurrence | Intensity
| Causality |
       Delay], *RankedLinkList, N, Location, Time, AppID)
```

The following SDK may be defined to get the linked nodes form the ranked links:

Get(*RankedLinkList, *Node)

In another example of SDKs, functions or API calls may be defined to set alert and event configurations for visualization and action events. For example, the following SDKs may be defined to set a profiler category resolution for a default number of categories (e.g., 20), and set an alert ranking threshold (e.g., within 1 standard deviation of a predefined threshold), and set alert rank list threshold:

```
       SetProfilerCategoryResolution(IoTSourceID, IoTVariableID,
           NumOfCategories) //default number of categories, for
    example: 20
       SetAlertRankingThreshold(STDAboveMean, IoTVariableID)
       SetAlertRankListThreshold(TopN, [StateName |
       StateTransitionName])
```

In another example of SDKs, alert destination and information setting APIs may be defined as follows to: get the user ID dynamically from the IDG (i.e. ListOfNodesUser); set dynamic user for alert (i.e. AddAlertDistributionList (ListOfNodeUsers)); set the application user list (i.e. AddAlertDistributionList(ListOfAppUser)); and provide Alert information (i.e. Alert).

```
       ListOfNodeUsers = GetUsersFromNode(NodeID)
       AddAlertDistributionList(ListOfNodeUsers)
       AddAlertDistributionList(ListOfAppUsers)
       Alert(AlertDistributionList, AlertInfo, timestamps,
       applicationID, IoTSourceID, IoTVariable, NodeID, LinkID)
```

Using the SDKs, such as the SDKs defined above, an application may provision the profiler and/or the IDG manager to select IoT variables that may be of interest to the application. Based on the variable definition and statistical model defined by the application, the AEPs in the profiler may process the selected variables and build a model for each variable. Once the model is built, the profiler may score the input IoT variable and output the score, state, state transition event, location, time, and/or range information to the interdependency (IDG) manager. The Interdependency (IDG) manager may use the configuration from the application and the inputs from the profilers to cumulate the statistical relationships between the events. The IDG manager may use AEP logics to update the statistical variables defined for each node and corresponding links of each node. Examples of statistical variables may include, but are not limited to include: occurrence; intensity; causality; and/or delay. The statistical variable among all the links may be ranked by each node. Score and/or ranking information may be stored in the node and/or the links of the IDG. The IDG manager may output IDG updates to the visualization and cooperative action controller.

In an example, an SDK may be provided for an application to define the IoT variables and statistical models for IoT device and user behaviors. AEPs may be written based on the selected variables and metric data collected by the profile manager after the profile manager builds the model and outputs event scores against the model. The AEP rules may be predicated on the scores and/or the behavior metrics. Furthermore, the AEPs may be predicated on the IDG, which may have the variables, state, state transition, and/or links statistics formats defined by configuration SDKs, such as the configuration SDKs defined above.

In an example, an auto-profiling and cooperative IoT operation management system may support multiple levels of automations in the profilers, IDG analysis and/or cooperative AEP definition, configuration, and updates. For example, a profiler may perform, but is not limited to perform, any of the following functions: receive a set of IoT sourceID and variable definitions configuration templates; generate and activate a set of AEPs from predefined AEP templates that implement the processing logic designed to extract and process input IoT events; support a set of variables and call the default and application specific processing function to compute a statistical distribution of the selected variables; process a set of input variables and decide the categories of the input variables; detect category change patterns and send the change events to the interdependency analysis AEPs; and/or periodically provide a snapshot of the variables to the interdependency analysis AEPs.

In an example, an IDG analysis manager may perform, but is not limited to perform, any of the following functions: receive a configuration template from an application, such that the configuration template may include the state, state transitions, and/or IoT definition templates from the application; generate AEPs based on the configuration template; perform IDG analysis; and/or provide the IDG to an cooperative action controller AEP and/or visualization AEP.

The following is an example AEP pseudo code that takes input events from profilers to track the interdependencies between users and environment IoT events. The input to the AEP pseudo code may be a sequence of events from profilers using profiler ID (e.g., ProfilerID). The events may contain Nodes (e.g., types of objects) that may include variables such as IoT device identification, user identification, states, and/or categories. If an input Node from the profiler does not exist in the IDG, a new Node may be created and inserted to the IDG. Otherwise, all the Node information may be read using NodeID from IDG. The example AEP pseudo code is as follows:

```
New Event = Read(ProfilerID), //(i.e. get profiler event output
    If (Node = Read (Event.Node.ID, IDG) == Null)
    //(i.e. Get Node from IDG)
    {Create(Node, IDG_ID)} //(i.e. add node to IDG)
New *linkList = Read(Link, Node, IDG_ID)
//(i.e. Find all the nodes in the IDG that may have
interdependency with the input Node)
Update (*linkList, NodeX, Type: [occurrence | intensity |
causality | delay]) //(i.e. update the link statistics such as
occurrence count, intensity correlation between state, delay
distributions, and/or probability of causality.)
```

In the above AEP pseudo code example, a default method of updating the link statistics may include a weighted average and standard deviation (STD) of each of the interdependency variables within a time span and/or distance range).

In an example, the output of the IDG analysis manager may be recorded in the IDG repository. When the IDG is updated, the IDG manager may send a notification to the cooperative action manager and the visualization manager to instruct these components to get the updated IDG. Examples are described below where the cooperative action control manager and the visualization manager may create and execute AEPs to provide alerts to users and control the actions to the IoT (e.g., IoT devices) using the IDG.

In an example, the following actions may be defined for generating AEP alerts and controls from default AEP templates. These actions may be performed by the cooperative action control manager and/or the visualization manager.

The default templates may include a set of event patterns and actions that may be predicated on the variables tracked in the IDG. Events from user/IoT devices or a central database with IoT source IDs and the variables selected by the application may be input to profilers and/or AEP processing managers. The nodes (e.g., user nodes or environment nodes) from the IDG that match the selected IoT sourceID and variables from the events may be retrieved from the IDG. Top ranked links may be searched to find the highly interdependent nodes. The set of selected links and the nodes pointed to by (i.e. interconnected by) the selected links may be inserted into working memory for real-time event pattern matching.

The selected links and associated nodes may be considered to form a "highly ranked IDG" related to the variables defined and/or selected by the application. Once the highly ranked IDG is created and tracked in working memory, an AEP instance may be created to match the new input nodes (e.g., new events which may arrive from a profiler) with the nodes in working memory. When a match is found, the AEP may read the statistical variables in the links by the ranking order. The AEP may alert users when an abnormal condition or an application specific threshold pattern is detected based on statistical variables (e.g., categories, ranks), or values defined in the application data type in nodes or links. For example, an abnormal condition may be detected automatically as a departure from the past statistical norm. The AEP searches for nodes with user actions and states. For example, states may represent the state of an IoT sensor, an IoT device, a user device, or a sensor on a user device. The AEP presents the variables, user actions, the states, and state transitions to a dashboard. The AEP may obtain actions in the node with the highest ranked interdependency from the IDG. The AEP may use the actions as references to generate alerts and remedial actions automatically.

In an example set of actions for generating AEP alerts and controls from default AEP templates, one or more users may inspect the IDG graph presented in the GUI and select an AEP from a set of predefined AEPs. Example actions involved for the display and selection process are described below. One or more high rank IDGs may be displayed in a GUI to a user. For example, each high rank IDG may comprise a set of the high or highest ranking links together with the nodes pointed to or interconnected by these links. Once the AEP templates are suggested to a user, the user may select one or more IDGs and one or more AEPs from the template. A user may then configure a subset of variables (e.g., selecting a subset of nodes) in a selected IDG or AEP template. The user may be given the option to add new variables (e.g., new nodes) to the selected IDG or AEP template, for example if a desired variable or node is not already present in the selected IDG or AEP template. The configured IDG may be inserted in working memory and the configured AEPs may be inserted into the AEP processing engine to provide the reference to the configured IDG in the working memory.

In another example set of actions for generating AEP alerts and controls from default AEP templates, application specific code generation procedures may be used. Based on the IDG, a code generation module may parse the IDG and a configuration template (which may be defined and/or provided by a developer, for example) to generate custom AEP code. The custom AEP code may contain functions to analyze a statistical behavior of the variables collected in the IDG. The custom AEP code may also contain a method to collect user input as feedback to improve the behavior analysis. The generated custom AEP code may be application specific or may use a default code generator from a service provider. The default code generator may provide external custom analysis service function call entry points to support dynamic plug-in of analysis functions. The custom AEP code may be wrapped into the action that invokes the service entry points from a customer defined AEP. In this case, a developer may register and/or activate the service entry points.

In another example set of actions for generating AEP alerts and controls from default AEP templates, an application developer may inspect the IDG and may code application specific AEPs manually. In order to do so, a developer may inspect the IDG (e.g., from the GUI), may find patterns of interest, and/or may code the patterns of interest into AEPs.

Example use cases of an auto-profiling and cooperative IoT operation management system are described below. In an example use case, detection of air-conditioner performance degradation based on IoT sensor data profiling and interdependency analysis is performed to alert users and/or control the setting of IoT actuators automatically. Some advantages of using the profiling and IDG in this scenario are described below.

In a typical home, office or building, the thermostat temperatures may be set to predefined temperatures at different times of the day and year. The predefined temperatures and the actual room temperatures may be profiled by an environment profile manager (e.g., the environment IoT sensor behavior model profiler 408 in FIG. 4) into: a set of actions to adjust the temperatures; and/or a set of states to represent the categories of the temperatures at different times of the day, month, or year, for example. When a specific window in a room is opened, the window contact sensor feature vector "open-duration" mapping may change categories (e.g., from category C0 to category C4). Since the outside temperature may fluctuate and the impact of opening different windows may not affect the feature vector (e.g., may not affect "on-duration" or other features) of a specific air-conditioner, different window opening events may have different interdependency with the on-duration of the air-conditioner depending on the locations of thermostats, the locations of the relevant windows, and/or other factors.

If the AEP rule is to detect mapped categories of any window "open-duration" greater than a threshold category, there may be many false alerts from windows that do not have strong interdependency with the on-duration of the air-conditioner. It may be difficult to set a specific threshold level for the open-duration because other factors may affect the threshold. Thus, categorizing the input feature vectors FVs into categories relative to the average and standard deviation may provide a ranked distribution that may control the number of alarms to be generated and reduce the effort of setting the threshold manually under many different user preferences and environment conditions.

Furthermore, the AEP rules may be predicated on the interdependency relationships to detect combined effects of multiple IoT sensor and/or user device sensor events (e.g., to detect combined effects of the opening or closing of multiple windows, as well as other factors). A template may be used to specify the weighted average of feature vector categories based on interdependency measurements of interdependency variables from one or more links. If the weighted average measurement is greater than a threshold defined by the distribution of weighted feature vector(s), the AEP may send an alert to the user, or the AEP may launch application specific actions.

The following pseudo code shows example AEP rules to detect and update the interdependency graph for a predefined sample interval, Tp, or when receiving state and category change events:

```
if Window_open-duration (t) != Window_open-duration (t − Tp)
//(i.e. sample time interval Tp)
    /*then set a timer to calculate the occurrence count for P samples
    before and after the time "t" to track the trends of user behavior
    changes when the environment condition changes and vice
    versa.*/
Update Link(Window_open-duration, Node).occurrence
/*the Update Link function may cumulate the occurrence counts of the
link as well as the occurrence count of the Node for each sample
interval for all the surrounding nodes within the range of the Node
without duplicated counts between two linked nodes. */
if Air_on-duration (t) != Air_on-duration (t − Tp)
// (e.g., air-conditioner feature vector "on-duration" has changed to a
different category, which is an indicator for different levels of energy
consumptions)
    /*then set the timer to calculate the occurrence count for P
    samples to observe the effects of an Environment change on user
    behavior change for all the interdependent links between the new
    Air-on-duration state and category and other nodes.*/
Update Link(Air_on-duration, Node).occurrence
```

In the above pseudo code example, the application defined name is used instead of an abstract name mapped by the system for ease of illustration. Also, the LocationRange and TimeSpan attributes defined in the Node may be used by the Update Link function as constraints for the set of nodes surrounding the Node of interest. For example, LocationRange data may be provided by an IoT device if such device is capable of determining its own location, or may be configured by a user (e.g., when installing a stationary device).

In another example, the following AEP template may detect higher than average window opening duration together with heater "on" duration (e.g., energy consumption) that have interdependency relationships with the particular window. Independent events such as heaters having a long on-duration or windows having a long open duration may not generate the alerts. The example pseudo code for the AEP template is as follows, where $C_k$ is the Window_open-duration category:

```
/*Get States, categories, Ck and other related parameters of all the
nodes and links that are related to the state and FV input events from IDG.
Ck is the new category produced from the profiler for Window_open-
duration.*/
If
    Ck > C8
//(i.e. greater than 80% of STD + average under the environment
context such as state, location, and outside temperature)
```

-continued

```
         And
         Link(window_open_duration_category_transition, air_on-_category
             transition).occurrence >
         Monthly_Avg_Link(window_open_duration_category_trantision,
             air_on-duration_category transition).occurrence
         // detecting the increases in occurrences of any air-conditioner
            //"on-duration" transition to a higher category caused by
any            //increasing window-opening-duration category"
         Then, send alert (e.g., to a user) with the window_open-duration
         category and associated state and descriptor for the specific
         window.
```

In the above example AEP template, if the window opening duration is not significant enough to make a category change or if the window opening duration does not cause the air-conditioner to have an "on duration" category change, the AEP may not send an alert to the user.

In an example the default AEP template may only request a user to specify the pattern of interest in terms of a window open duration and heater on duration category transition events as mapped by the profiler. The AEP template may not need an application to write separate code for a data model, threshold configuration, interfaces to IoT devices, and processing logics. The interdependency may be captured by timer setting for P samples of preset time intervals. The AEP template may capture the transition of the causality effects for P*Tp period of time before the current sample time. An update function may calculate the relationship between the transitions as well as the continuous effects on the transition for a time window of total time 2 P*Tp after the current sample time. An event may be generated to indicate (e.g., to capture) the transitions. The fixed sampling interval may capture stationary behavior of individual nodes (e.g., duration, FV) if there are no dependency events within the 2P time sampling windows.

The above example use case shows one example of many possible patterns of interest that can be detected by the AEP using the statistical variables captured in the IDG. AEP templates may be used for multiple applications to convert variables with different naming conventions and different dynamic ranges to generic statistical variables with normalized ranges. For example, the application variable names may be mapped to a list of unique identifiers (IDs) and FVs to a normalized value range (for example, a range of [−1, 1]). The IDG generated and inserted in the working memory may consist of the unique and generic node ID, a link ID, normalized values and categories, and/or statistical variables defining the interdependencies.

Based on the IDG inserted in working memory, when the AEP detects any new event, the AEP may evaluate the ranks of any interdependent links and nodes to determine if any actions shall be taken that have not been taken. For example, when a heater is overloaded, alerts to users may result in actions (e.g., actions taken by the user) to lower the thermostat setting, close some windows, and/or close the vents of nearby rooms. As the IDG accumulates the events on states, state transitions, and user actions, the most recent and frequent actions associated with state or state transitions may have a higher interdependency in the IDG.

In an example, the AEP processing may be applied to detect complex patterns and record the occurrence, intensity, causality, and/or delay of interdependencies between the user and the environment. AEP processing may also be applied to detect (complex) patterns for "environment-to-environment" or "user-to-user" interdependencies. To reduce the number of nodes and events (e.g., the number of expected state transitions between mapped categories), a central system (e.g., a central auto-profiling and cooperative IoT operation management system) may configure the resolution of each category for each specific variable in a configuration template.

The example use cases described herein illustrate different types of AEP templates that may be used to generate AEPs for different applications to detect a typical set of patterns of interest and launch actions automatically based on the IDG. The following example AEP template may detect interdependency trends and inactivity among the users and IoT. In the case of a significant change in interdependency variables defined in the Links between two nodes, the following example pseudo code may be used:

```
    /*From time t = t_i to t_i + W * Tp, where W is the number of sample
    intervals in a moving window W, the function diff( ) calculates the
    change in inter- dependency. For example, transition to state S_x causes
    changes in FV of state S_y for W sample periods. The diff( ) is the average
    increment rate. */
    If
        diff (Link(S_x, S_y))
        < average (diff(Link(S_x, S_y))) − 70% std (diff(Link(S_x, S_y)))
        //(i.e. if the average diff( ) within a moving window, W * Tp is
           under same context (e.g., similar zone and temperature setting,
           time of the year))
    Or
        diff (Link(Sx, Sy))
        > avg(diff(Link(S_x, S_y))) + 70% std(diff(Link(S_x, S_y)))
    Then,
        Send alert to users and report the significant changes in inter-
           dependency between two feature vectors.
```

The above example AEP template may detect any of the following conditions. For example, the condition when there are increasing or decreasing trends on any interdependency between any two "state and category changes" (e.g., "window_open-duration", thermostat setting", "heater-on-duration", "Door_close-duration", "oven_on-duration" and "heater's on-duration") that is faster than the average trend by some threshold (e.g., 0.7 standard deviations, as illustrated above), then, alert the user.

Alerting the user may involve sending an alert message to a designated user, or to one or more users in the vicinity of an IoT device that provided state or data information based on which the alert was triggered. Alerting the user may involve sending an alert to one or more users in or near a physical location in which a suggested user action would take place (e.g., to a user near an open window, if the alert suggests closing the window; or to a user near a thermostat unit, if the alert suggests manual adjustment of the thermostat setting). Alerting a user may involve displaying an alert (e.g., using text and/or graphics) in a "dashboard" display. The dashboard may be displayed on a personal computer, a smart home or smart office control unit, a mobile device such as a tablet or mobile phone, or on any display accessible and visible to a user.

In an example, an auto-profiling and cooperative IoT operation management system may detect events (e.g., interdependency related events or trends) that would be difficult for a user to detect manually because a user may not be able to manually track the occurrences of dependency change over a long period of time. An example of such an occurrence may be the time it takes to heat the room to 70° after automatic thermostat adjustment from 60° to 70°, which may be 10 minutes on average (e.g., it may be desirable to automatically adjust the thermostat so that the target temperature is reached before the user returns home at, for example, 5 pm). If the time delay between setting of thermostat and the time to heat the room takes longer than the previous weekly average plus 0.7 standard deviation, the user may be alerted for the increasing heating time and the user may be prompted to find a possible cause. The possible cause may in some cases be obtained or determined from state and state transitions that are dependent on heating duration or the on-duration of the specific heater (e.g., a window is open, a door is not closed properly, or the outside temperature has dropped). In this case, the auto-profiling and cooperative IoT operation management system may provide the user with information about the detected interrelations to aid the user in determining the cause. Such information may be provided in the alerts, or may be displayed (e.g., using graphics or text) on a dashboard display.

In the case of inactivity detection, example pseudo code for AEP processing for a rule to detect the occurrence count and delay interval of interdependent states may be defined as follows:

```
/*Link(Sx, Sy) is denoted as the Link between two specific nodes,
Sx and Sy. The interdependency types, values and models (e.g.,
daily, monthly, or yearly averages of values for each
interdependency type) may be accessed from the IDG. For
example, daily-Link(Sx, Sy).occurrence, weekly-average(Link(Sx,
Sy).occurrence) and weekly-std(Link(Sx, Sy).occurrence) may be
used to get the model parameters stored in the IDG. */
If daily-Link(Sx, Sy).occurrence < weekly-average(Link(Sx,
    Sy).occurrence) − weekly-std(Link(Sx,
Sy).occurrence),
Or
//(i.e. the delay between the dependent nodes are one STD over
the average)
weekly-Link(Sx, Sy).delay < monthly-average(Link(Sx, Sy).delay) −
    monthly-std(Link(Sx, Sy).delay)
```

The above example rule may detect conditions that would be difficult for operators and users to track. For example, the above rule may detect or determine that node $S_y$ is "inactive" in its relationship to $S_x$, as follows: when state $S_x$ occurs, determine whether state $S_y$ did not occur or occurred much less often or had a longer delay between the occurrence of Sy relative to the occurrence of $S_x$ compared to a relationship between $S_x$ and $S_y$ as known from past observations or past recorded data. The determination may be made by comparing data that describes the current occurrence or delay relationship between $S_x$ and $S_y$ to past statistical data (e.g., average+a standard deviation). If such a determination is made, then the rule may specify that a user should be alerted that $S_y$ is inactive. Such logic may be extended to encompass other variables with other relationships, for example: when ($S_x$, $S_y$) occurred normally (e.g., in terms of occurrence or delay or both), but ($S_y$, $S_z$) did not occur normally (e.g., occurred much less often, or occurred having a longer delay, compared to past statistical data describing the relationship between $S_y$ and $S_z$), then alert the user that $S_z$ is inactive.

In another example use case, given a specific environment transition event, one or more user actions or device state transition nodes may be found that have higher interdependency ranking than others. The rankings may be used to generate an AEP to inform users about what has been done in the past and suggest automated actions when the user does not act on the change after a time delay longer than the typical time window of the typical user actions related to the environment change.

Figure 7:
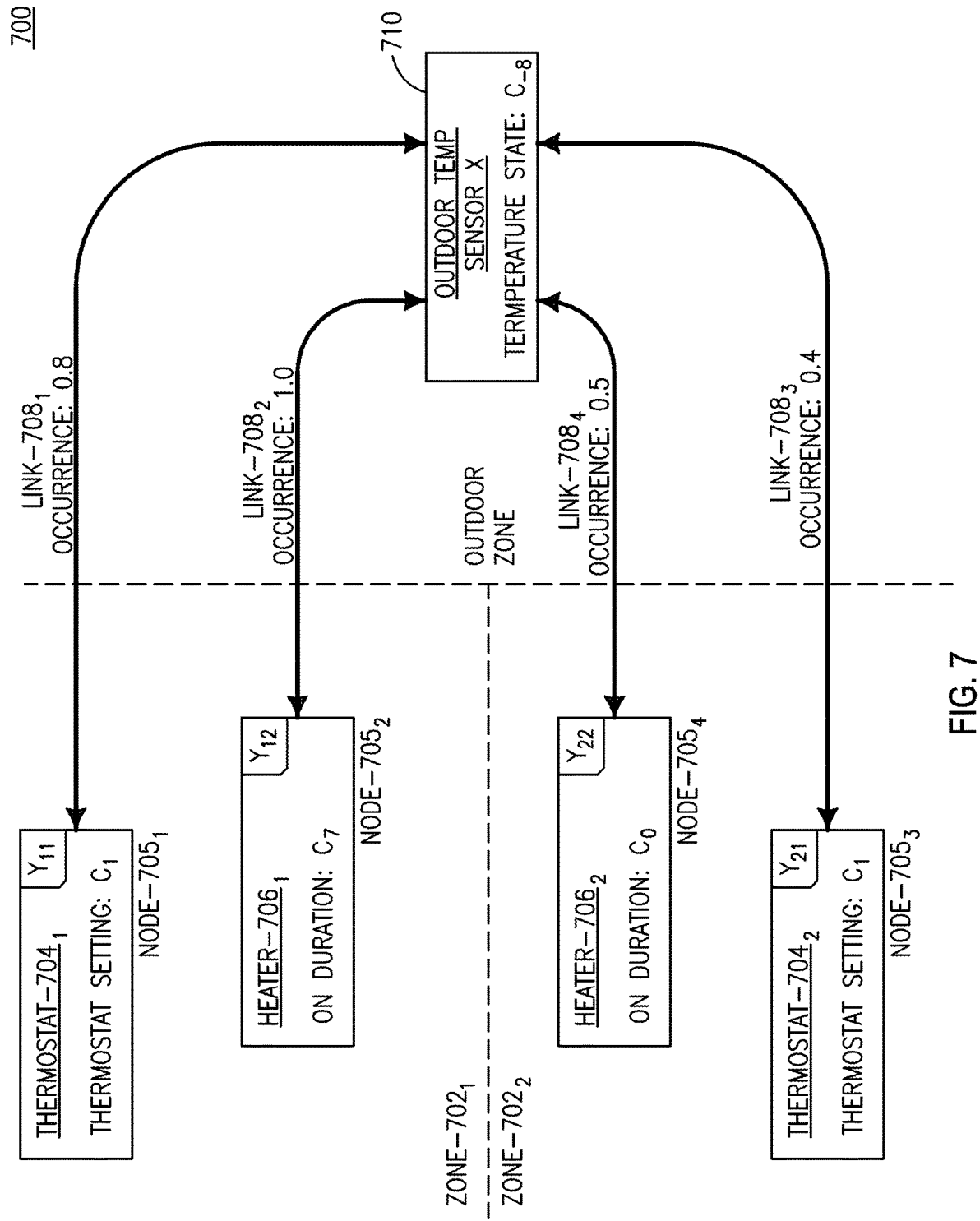
FIG. 7 is a diagram illustrating an interdependency graph (IDG) that characterizes the interdependency between devices.

FIG. 7 is a diagram illustrating an interdependency graph (IDG) 700 that characterizes the interdependency between devices. For example, the visual representation of the IDG 700 may be displayed on a GUI. The visual representation of an IDG may visually show the IDG nodes, which may correspond to states and/or state transitions, and which may be derived from sensor data and/or events from user devices and/or IoT devices, as described herein. The IDG 700 in this example shows the interdependency of an "outdoor temperature drop to 80% below the normal temperature of the day", the "thermostat actions", and "heater on duration" in a multiple zone building. The IDG 700 includes a zone $702_1$ that may include, but is not limited to include, the following IoT devices: a thermostat $704_1$ defined as node $705_1$ with thermostat setting defined by category $C_1$; and heater $706_1$ defined as node $705_2$ with an on duration defined by category $C_7$. The IDG 700 includes a zone $702_2$ that may include, but is not limited to include, the following IoT devices: a thermostat $704_2$ defined as node $705_3$ with thermostat setting defined by category $C_1$; and heater $706_2$ defined as node $705_4$ with an on duration defined by category $C_0$. In this example, a lower category number (e.g. $C_0$) indicates a lower temperature, and a higher category number (e.g. $C_7$) indicates a higher temperature.

The outdoor temperature sensor 710 may have a temperature state defined by category $C_{-8}$ (i.e. $C_{-8}$ may imply that the outdoor temperature drops to 80% below the normal temperature of the day) and may have interdependencies with the IoT devices of the IDG 700. For example, the following interdependency links may exist with the outdoor temperature sensor 710 in IDG 700: link $708_1$ to thermostat $704_1$ with occurrence equal to 0.8; link $708_2$ to heater $706_1$ with occurrence equal to 1.0; link $708_4$ to heater $706_2$ with occurrence equal to 0.5; and link $708_3$ to thermostat $704_2$ with occurrence equal to 0.4.

An IDG may be used, for example, to alert one or more users, trigger automatic thermostat adjustment, and/or provide insight on heater usage patterns in different zones. If the heating capacity and space for each zone is the same, then a room with poor insulation may cause more adjustment of thermostat to a higher temperature, or may cause a heater to run at a higher capacity. The following example pseudo code corresponds the IDG 700 in FIG. 7:

```
/*Outdoor Temperature Sensor X is in "FV: C−8" state (i.e., −80% std.
below seasonal average): //Links to thermostat and Heater nodes.*/
New EventNode = {IoTSourceID: ID, //OutdoorTemperatureSensor,
    Category: C−8}   //FV is mapped to C−8 category.
```

-continued

```
//Top 2 ranked Interdependency list from the IDG from two zones.
NodeList =
   {Node705₁: {IoTSourceID: Thermostat1, Location: Zone 702₁, NodeID:
Y11,       State: ThermostatSetting, Category: C1}, link: {Occurrence: 0.8},
    Node705₂: {IoTSourceID: Heater1, Location: Zone 702₁, NodeID: Y12,
    on_duration:  C₇}, link: {Occurrence: 1},
    Node705₃: {IoTSourceID: Thermostat2, Location: Zone 702₂, NodeID:
Y21,       State: ThermostatSetting, Category: C₁}, link: {Occurrence: 0.5},
      Node705₄: {IoTSourceID: Heater2, Location: Zone 702₂, NodeID: Y22,
                 on_duration: C₀}, link: {Occurrence: 0.4}
   }
```

Based on the IDG, the following example AEP template may be used to detect deviations from the most frequently observed patterns under a specific context, such as outdoor temperature. The AEP may alert a user about the most frequently occurring node state of a thermostat setting node or a heater on-duration when detecting a current event pattern that is not the same as the most frequently occurring patterns tracked in the IDG as the outdoor temperature drops to $C_{-x}$ (e.g., $C_{-8}$). The example AEP template is as follows:

```
/*get the input event from outdoor temperature sensor. An IDG Node
   is set to the node representing outdoor temperature in the C₋₈
   category.*/
   New IDGNode = Event(IoTSourceID: "OutdoorTempSensorX",
      State.C : "C₋₈"),
   /* Find the top ranked link, (e.g., "1" link) depended on the Node.
   *TopLink = GetRankedLinks(IDGNode, Occurrence, 1,
      Location: {Zone7021₁, Zone702₂})
   New TopNode = Get(*TopLink) //Get Top ranked Node from the
TopLink.
   /*Get the input event from the IoTSourceList to detect
   if the state in the current input event node is different from the
   TopNode representing the thermostat setting or on-duration of
   heater*/
   New CurrentEventNode = Read(IoTSourceID: {Thermostat, On-
duration}, ...),
      If (CurrentNode.Category != TopNode.Category),
      Then, Alert("The current state is different from previously observed
      state", TopNodes, "when outdoor temperature drop to C₋₈").
```

Referring back to FIG. 7, the IDG 700 shows the interdependent links $708_1 \ldots 708_4$ connecting the nodes $705_1 \ldots 705_4$ representing the outdoor temperature sensor 710, two thermostats $704_1$ and $704_2$, and heaters $706_1$ and $706_2$ located in two indoor zones $702_1$ and $702_2$. For example, link $708_1$ shows the status of the occurrence interdependency between thermostat $704_1$ in setting category $C_1$ and outdoor temperature sensor 710 in temperature category $C_{-8}$ to be 0.8 (e.g., on a scale of [0,1]). Link $708_2$ shows the status of the occurrence interdependency between heater $706_1$ with on-duration $C_7$ and outdoor temperature sensor 710 in temperature category $C_{-8}$ to be 1.0 (e.g., on a scale of [0,1]). The link status for the outside temperature category $C_{-8}$ has strong dependency on thermostat $704_1$ (Node $705_1$ or $Y_{11}$) setting to $C_1$ and an even stronger dependency on heater $706_1$ (Node $705_2$ or $Y_{12}$) operating at a high "on-duration" (e.g., in high category $C_7$) in zone $702_1$. However, Heater $706_2$ (Node $705_4$ or $Y_{22}$) has a significantly lower "on-duration" (e.g., in average category $C_0$) in zone $702_2$, even though thermostat $704_2$ (Node $Y_{21}$) has the same or similar temperature setting (e.g., $C_1$) as thermostat $704_1$. As a result, an action controller may alert an operator that the zone $702_1$ heater $706_1$ is likely to have higher usage than the zone $702_2$ heater $706_2$ when the temperature drops to 80% STD below the average.

The action controller may also be possible to infer that the thermostat settings by users tend to be higher than average ($C_1$ and $C_1$ for zones $702_1$ and $702_2$, respectively) and that heater $706_1$ (Node $705_2$ or $Y_{12}$) is on much more frequently than its historical average, or is on much more frequently in comparison to heater $706_2$ (Node $705_4$ or $Y_{22}$). If both zones $702_1$ and $702_2$ have the same space and heater capacity, the action controller may also infer that zone $702_1$ has less insulation than zone $702_2$.

In another example use case, multiple types of sensors from multiple types of applications, such as fitness and energy management, may be combined to automatically adjust IoT configurations based on interdependence between user activities, devices and environment conditions. For example, when a user is engaging in high intensity exercise, the user's behavior measurement (e.g., heartbeat, pulse rate, steps per minute, current mode, intensity setting on a smart treadmill, and/or other measure of user exercise behavior) may transition to a new category (e.g., 80% std above average category). In the new category, the preferred temperature setting for the user may be lower than normal. For example, a user may adjust the thermostat setting to a cooler temperature when beginning an exercise routine. When a user finishes exercising, and the user_behavior measurement transitions or is transitioning back to the normal state, the user's preferred temperature setting may return to a normal temperature setting, and the user may adjust the thermostat accordingly.

After the user exercises and adjusts the temperature manually a few times, the IDG may capture the interdependency of the exercise state and the lower temperature setting (e.g., thermostat setting) state. This interdependency may be used by the temperature controller to adjust the thermostats when users are engaging in intensive exercise. An example of nodes and links for the above example use case is listed as follows:

```
(User X, pulse rate: C₇) has the following interdependent links:
   {(Smart_treadmill_W, intense_running_mode: C₈), Intensity:
   0.9
   (User_X.action, Thermostat_setting: C₋₆), Occurrence: 0.5
   (User_X.action, Thermostat_setting: C₋₇), Occurrence: 0.8
   (Energy_management _app_E, Thermostat_setting: C₋₆),
Occurrence: 0.9)
   (Energy_management _app_E, Thermostat_setting: C₋₇),
Occurrence: 0.6)
   Note that the Occurences value here represents the percentile
   ranking based on statistical model.
```

In an example, the IDG as described herein may be used to detect that when a smart treadmill is in intense running mode, the most frequent user action is to set the thermostat to a lower temperature $C_{-7}$. If the user did not set the thermostat, an energy management application (e.g., application E), may set the thermostat to a lower category $C_{-6}$ more frequently than setting the thermostat to $C_{-7}$.

A set of example AEP templates that may be used to generate many different variations of detection and control functions based on the IDG to integrate multiple types of applications are described as follows:

```
/*AEP configuration template: Input = {IoTSourceID, Location,
UserID, DeviceID, Profiler, applicationName}
  /* Assume that profiler gets an IoT actuator target setting event and
an event indicating the temperature has reached the target setting. The
time duration is a state variable tracked by profiler.*/
  /* Get user location and device (e.g., treadmill) location and obtain
the IDG graph for IoTSource : {vital sign and treadmill}. Get the
corresponding
    Profiler service entry point for the IDG. */
      New *IDG = Read(IDG, location, TimeOftheDay, User-ID)
      New *IDG = Read(IDG, TimeOftheDay, treadmill-ID)
      New *profilerSrv = get(IDG, location, time, applicationName)
      //(i.e. obtain entry point)
      //(i.e. receive profiler events)
      New Node = Read(Profiler) // (i.e. get next event node from
profiler)
      /*Abnormality Filter 1*/
```

If there are abnormalities detected (e.g., the Category and FV of the Node is at least 1 std>average), e.g., temperature is at 85° or thermostat set to 50°*/

```
      //get top N linked nodes to observe nodes with high causality
          //dependencies.
      New *LinkedNodeList = ReadLinkedList(*IDG, minRank = N)
      Get *2ndLinkedNodeList =ReadLinkedList(*LinkedNodeList,
          minRank =  N)
      /*Special but consistent case Filter 2*/
      /*If a node in abnormal state is linked by one or more high causality
          dependency nodes, it means that the node is not in a normal
condition, but the causes of the abnormal condition are not abnormal and
happen many times. This may suggest that separate operation clusters can
be separated from the current distribution category. Informational alerts
may be displayed in a dashboard. The IDG also may support an
informational alert for rare or first occurrence events that have caused
intensity or delay
          abnormalities. For example, the following patterns may inform a user
about the rare event cause an abnormal state in the dashboard.*/
      For LinkedNodes with time stamp before the current node,
      And
          (Causality of the link) < (Average − 1 std) //(i.e. rare
causality)
          And,
              C_8 < (LinkedNode.Category) //(i.e. node state is abnormally
high)
      Then,
              Inform a user about the rare event causing an abnormal
state in          the dashboard.
```

In another example, the IDG may provide a rich data model for generating multiple combinations of AEPs. Other types of AEPs including filters predicted on action and state in the first and second level interdependencies are described as follows:

```
      /*A filter for automatic actions can be implemented by inspecting
      the source ID of node for user and system actions. Node contains
      the following descriptor:*/
      /* Find user action events under the same state that have
      resulted in changing of the state back to normal. Assuming that
      the IDG supports the select operator similar to SQL syntax. */
      //Find highly interdependent user actions from IDG.
      ActionNode = Select LinkedNode in IDG where NodeID ==
          CurrentNodeID and LinkedNode.DS.Action = User-Action
      //Find the user action nodes that have states matching the
current          //node ID but where the states are returned to
normal after the actions         //more than P times.
          EffectiveAction = Select LinkedNode in IDG where NodeID ==
              ActionNode
      And
      Link.occurrence > MaxCount, // A maximal count.
      And
      LinkedNode.DS.StateID = currentNode.DS.StateID //Match the
node          //state.
      And
      C−5 < LinkedNode.DS.State.Category < C5
      /*Alert user to recommend actions that may change the abnormal
state     back to a normal state. */
```

Examples of weighted interdependency ranking and inactivity detections are described herein. In an example of a default method for weighted interdependency ranking and inactivity detection, a first analysis of interdependency parameters such as occurrence (e.g., $P(S_x.C_k, S_x.C_k)$), causality (e.g., $Q(S_x.C_k, S_x.C_k)$), intensity (e.g., $A(S_x.C_k, S_x.C_k)$), and/or delay (e.g., $D(S_x.C_k, S_x.C_k)$) dependencies between the two states under the time span and location range constraints, $R_k$, may be undertaken as follows:

---

$P(S_x.C_k, S_x.C_k) = \{avg((S_x.C_k, S_x.C_k).Occurrence), std((S_x.C_k, S_x.C_k).Occurrence)\} \mid R_k$ // The estimated state occurrence dependency.
$Q(S_x.C_k, S_x.C_k) = \{avg((S_x.C_k, S_x.C_k).Intensity), std((S_x.C_k, S_x.C_k).Intensity)\} \mid R_k$ // The estimated intensity dependency.
$A(S_x.C_k, S_x.C_k) = \{avg((S_x.C_k, S_x.C_k).Causality), std((S_x.C_k, S_x.C_k).Causality)\} \mid R_k$ // The estimated causality dependency.
$D(S_x.C_k, S_x.C_k) = \{avg((S_x.C_k, S_x.C_k).Delay), std((S_x.C_k, S_x.C_k).Delay)\} \mid R_k$ //The estimated causality dependency.

---

A weighted average, {P·Q, P·A, P·D}, for intensity, causality, and delay may be calculated. For different applications, a subset of the interdependency parameters may be selected by an application developer. The weighted average {P·Q, P·A, P·D} may be ranked and the rank list may be maintained in persistent storage.

In another example, transitional inactivity of two interdependent transitions between two states and feature vector categories, $S_x.C_1$ and $S_y.C_j$ may be detected. The following rule may be used to detect and send an alert when expected transitional activities did not happen or have a longer time delay than one standard deviation:

If $\{(S_x.C_i, S_y.C_j).Delay\} > avg(S_x.C_i, S_y.C_j).(P \cdot D) + std(S_x.C_i, S_y.C_j).(P \cdot D)$ An interdependency inactivity trend change detection as given above may offload the users and operators from tracking the complex combinations of missing events or slow response events.

In another example, systems and interfaces for cooperative operation are described herein. A system architecture may be defined for IDG operation control and visualization in a 3D virtual reality environment. Such a system architecture may include a system and interface to integrate the AEP processing with multiple applications, users, and distributed IoT.

Figure 6:
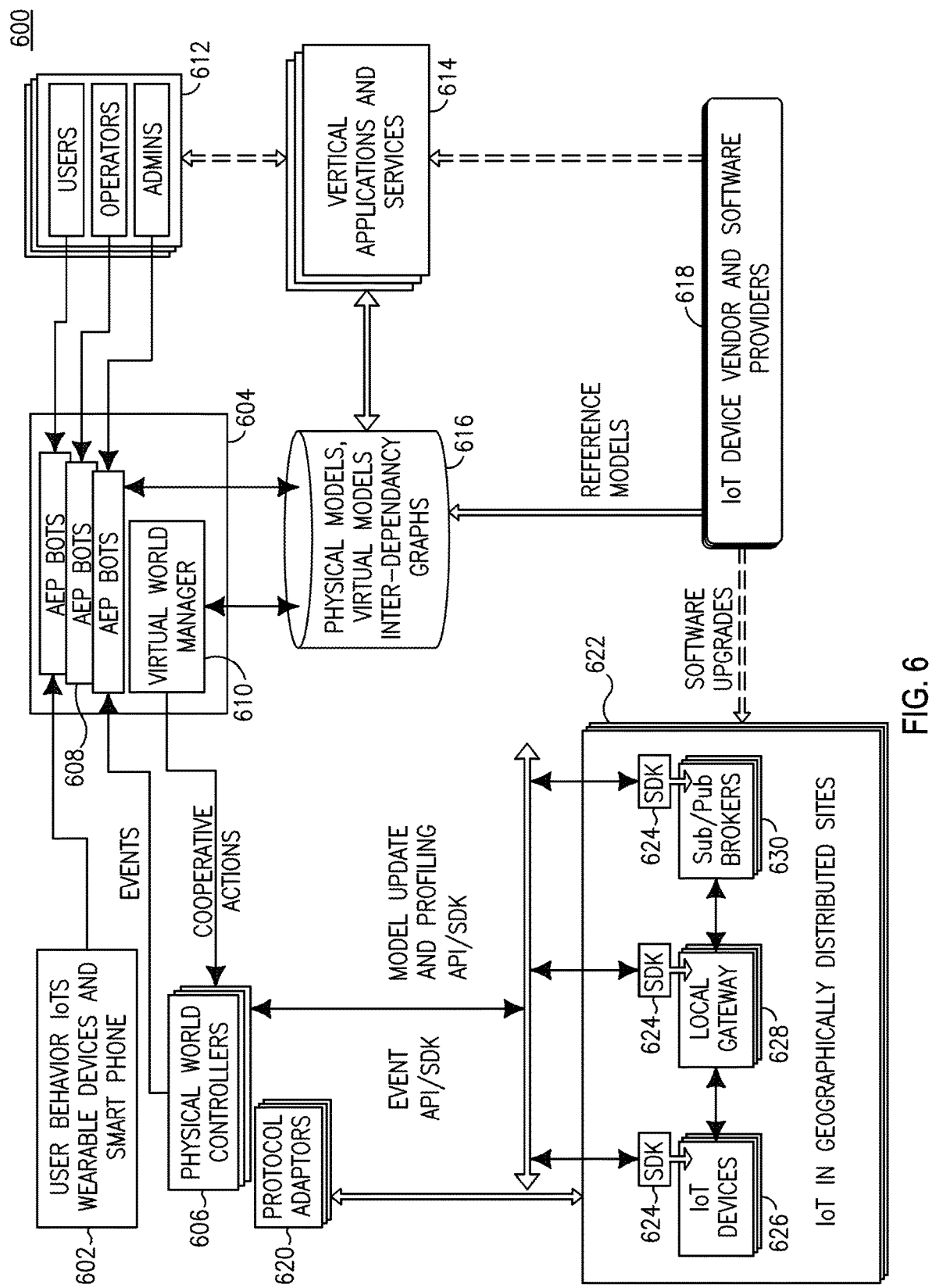
FIG. 6 is a block diagram of an example actionable event pattern processing and visualization system.

FIG. 6 is a block diagram of an example actionable event pattern processing and visualization system 600. The actionable event pattern processing and visualization system 600 may interact with an IoT 622, which may be located in geographically distributed sites, and may include IoT device(s) 626, local gateway(s) 628, and sub/pub brokers 630, which may interface with the actionable event pattern processing and visualization system 600 using SDK(s) 624.

The actionable event pattern processing and visualization system 600 may include an AEP processing unit 604. Although not shown in FIG. 6, the AEP processing unit 604 may include sub-processing units and functionalities previously described in the AEP-processing enabled profiling and action control manager system 500 of FIG. 5. For example, AEP processing unit 604 may include a user behavior profiler 508, an environment profiler 510, an interdependency analysis AEP processing manager 512, and/or a cooperative action control AEP processing manager 514 as shown in FIG. 5. In another example, AEP processing unit 604 may be capable of any functionality previously described for these sub-processing units.

The AEP processing system/unit 604 may be deployed in a virtual (AEP) bot(s) 608 running in, for example, a 3D virtual environment, with a virtual world manager 610 to map all the physical devices to virtual locations. The AEP bot(s) 608 may be an invisible control program or integrated inside a visible avatar, for example. The AEP in the bot(s) 608 may detect event patterns, access the IDG (e.g., stored in storage 616), send alerts, and/or perform automated control actions. IoT sensors (e.g., as part of devices 602 and/or IoT devices 626) and actuators (e.g., located in controllers 606 and/or IoT devices 626) may be modeled and mapped as objects in the 3D virtual world. The profiler AEPs (not shown, see for example profilers 608 and 510 in FIG. 5) may interact with the virtual world manager 610 to display, for example, the score, state, FVs, IDG and/or transitional event propagation on graphic objects in the virtual world in real-time.

A physical IoT controller 606 may be used to register, transform, and map physical functional models (input, output, and state) (e.g., stored in storage 616) of individual and/or group of IoT to 3D virtual behavior models in a virtual world. For example, the physical IoT controller 606 may determine and register locations of IoT devices and/or sensors such as sensors in IoT devices 626 and/or sensors in user devices 602. A physical IoT controller 606 may synchronize the physical functional and virtual behavior models (e.g., stored in stored in storage 616), control and adjust physical IoT configurations, and expose service interface of IoT devices 626 to AEP processing logic implemented by bot(s) 608 in the virtual world.

A virtual IoT behavior model manager 610 may be used to import IoT physical functional interfaces and behavior models (e.g., mean time between failure and maintenance) into a cooperative control and management virtual world environment. A virtual IoT behavior model manager 610 may perform any of the following functions: create AEP controller bot 608; AEP bot to profile, calibrate, and visualize the physical behavior models for cooperative IoT devices 626 based on multiple vertical application contexts and environment conditions; track, predict and rank the IDG; rank interdependency parameters of individual and group behaviors; and/or identify resource sharing opportunities and effectiveness, using the IDG, among IoT devices. For example, local heater or vent control in an adjacent room that has high interdependency on the room temperature of a remote and less insulated room may be candidates for resource sharing. A virtual IoT behavior model manager 610 may also search and launch effective actions to physical IoT controller (e.g., physical world controller 606) to preempt the risk and improve the reliability.

SDKs 624 may be provided, including an easy to use IoT event SDK 624 to simplify the integration effort with multiple types of IoT devices 626, gateways 628 or brokers 630. The SDKs 624 may extend the standard protocols and data models used in standard IoT application protocol broker 630 (e.g., CoAP) to support additional functions to configure and use the IDG SDK. As devices become more intelligent, appliances or wearable devices 602 may perform intelligent processing using the IoT sensor metric variables to support model update SDK for a profiler (not shown; see previous description of profilers). An SDK 624 may also support encryption of IDG and AAA to the protected IoT devices 626.

An AEP bot 608 may provide a single point of entry for users to interact with the models and IDGs. The operators and developers may use the state and FV mapping template as well as AEP templates to customize the IDGs. When there is an IoT overload or failure event, the AEP processing unit 604 may locate sensors and actuators based on interdependency, location and range parameters in IDG to provide cooperative actions. For example, the sensors and actuators may be located in user devices 602 or in IoT devices 626.

The cooperative control actions may be provided by the virtual world manager 610 to adjust and increase outputs of one or more actuators (e.g., physical world controllers 606) to support a particular zone that requires more resources or to offload overloaded devices. For example, when an overloaded heater with very high "on-duration" is detected, the heater may be viewed in the virtual world using the color red. The possible causes may be obtained from the IDG (e.g., outside temperature is extremely low and a window may be open) and displayed in 3D virtual world to alert and recommend remedial actions to users. The actionable event pattern processing and visualization system 600 may further include or interact with users/operators/admins 612, vertical applications and services 614, and or IoT device vendor and software providers 618, as shown in FIG. 6.

In an example, links between the heater and other IoT devices or user devices may be displayed and annotated (e.g., in the 3D virtual world) in order to indicate and/or highlight the relevant interdependencies. If an alert is sent or displayed, and if the user does not react to the alert in a timely manner, the system may automatically search the IDG and find highly dependent user actions for the environment condition that requires attention immediately. For example, an AEP bot may find that "turn on a local heater, Y" action to assist the overloaded heater, has the highest causality dependency count compared to any other action. Then, the AEP bot can launch the action automatically. The AEP bot may also find that the "turn off the vents" action in the adjacent rooms has a high occurrence dependency count on the heater overloading condition. In that case, it may also launch the "turn off the vents" action at the same time.

Figure 8:
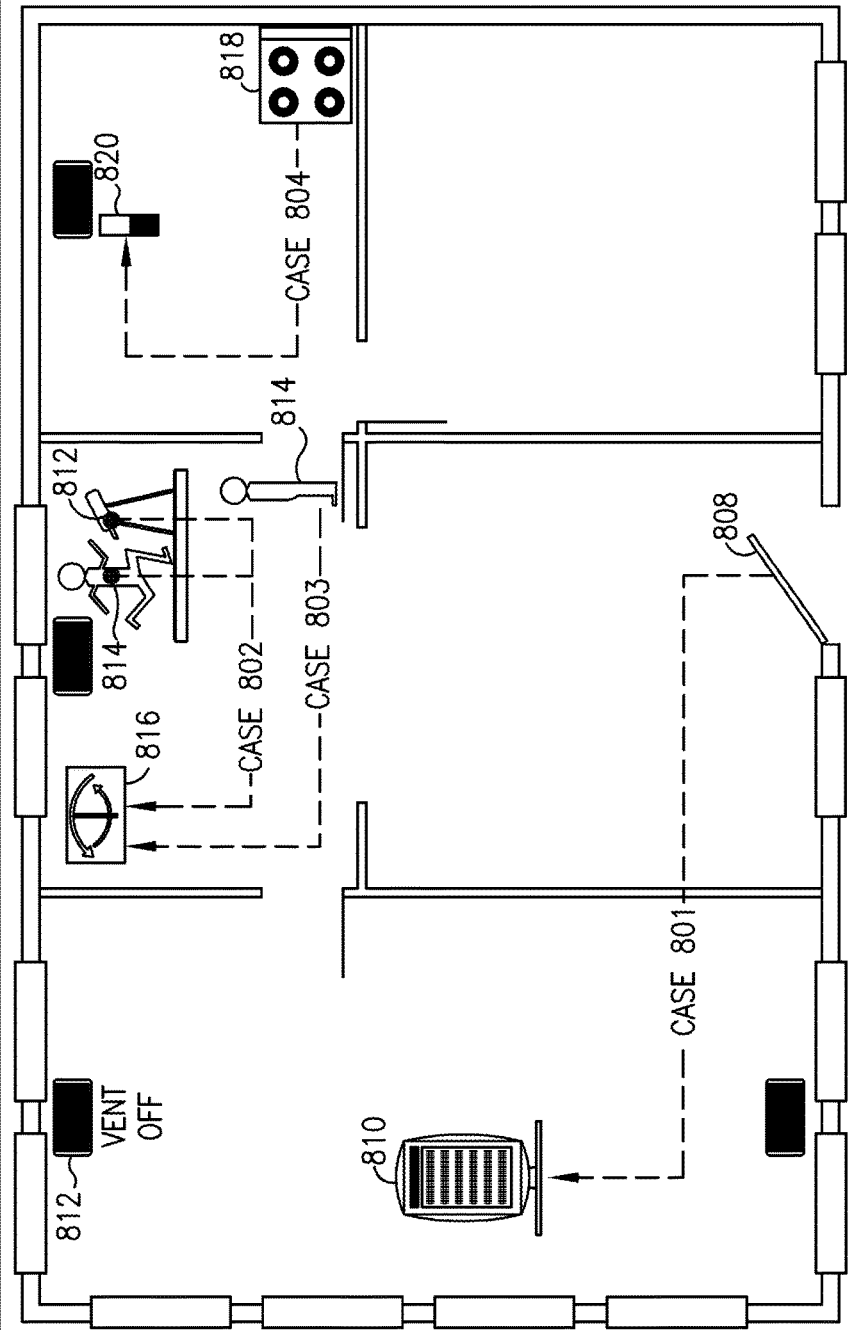
FIG. 8 is a diagram of an example advanced IoT environment illustrating interdependent behavior pattern virtualization.

FIG. 8 is a diagram of an example advanced IoT environment 800 illustrating interdependent behavior pattern visualization. The IoT environment 800 may be displayed to a user in a visual and possibly interactive user interface. The display of the IoT environment 800 may visually depict interdependency information from an IDG. For example, the links of the IDG may be visually depicted in the display, and the endpoints of the links may be shown as connected to the devices or objects to which the IDG nodes (or their associated state or state transition) correspond. The IoT environment 800 may include, but is not limited to include, any of the following objects and devices: window(s) 808; heater(s) 810: vent(s) 812; user interactions 814; thermostat 816; heat generating object 818 (e.g., stove); and/or thermostat 820.

An IoT environment, such as IoT environment 800, may include other objects and/or devices such as doors with contact sensors, smart appliances, networked security cameras, and/or user devices such as mobile phones, tablets, PC's, and wearable devices. Object and device locations may be reported by the various user devices and/or IoT devices so that their positions may be properly displayed by a visualization manager. Objects and devices that do not have built-in location reporting capabilities may be outfitted with separate location tracking devices (e.g. indoor location tracking devices 202 shown in FIG. 2). Objects that are relatively fixed (e.g. windows, doors, heaters, air conditioners, and treadmills) may have their locations manually configured by the user via the user interface. Exact object locations may not be needed to effectively relate the interdependency relationships to a user; merely assigning an object location near to its true location (e.g. anywhere in the room where the object resides) may be sufficient to convey such interdependency information to the user.

With reference to FIG. 8, example cases 801-804 are shown where the interdependency between events may be used to guide the users and operators using, for example, a floor plan, a spatial map, or another representation that depicts the locations of objects, users, and devices such as user devices and/or IoT devices. The floor plan, spatial map or other representation may be displayed to the user via a 2D visual display, a 3D graphic display interfaces, a head-mounted display (HMD), and/or the like. A dashboard 830 may also be provided to display the highly ranked alerts. The contents of the alerts may be derived from the top ranking nodes and links in the IDG. The dashboard 830 information may be displayed in a separate region of the display as shown FIG. 8, or the dashboard 830 information may be displayed in a more interactive fashion (not shown). For example, the information describing a particular interdependency link (such as the case 801 information in the dashboard 830) may be displayed as pop-up or overlay information for the individual case 801 when the user selects the corresponding link in the visual display. Selection of the link in the visual display may be an explicit selection (e.g., touching the link on a touchscreen), or an implicit selection (e.g., hovering over the link with a mouse, or looking directly at the link when the display is an HMD).

In example case 801, when a window 808 is left open unintentionally during the day, it may affect the temperature in different rooms and cause heater 810 in a nearby zone to run at higher than normal load. When the heater 810 is running at a much higher load than other heaters in different zones and if the window 808 had caused the increase in higher load of the same heater 810 more frequently than other windows, the occurrence and intensity interdependencies between the specific window 808 open state (which may be known from an accessible window contact sensor, for example) and the specific heater 810 with high load state will be higher than other windows. As a result, the system may alert the user to check and possibly close the window 808.

In example case 802, when the user interacts 814 with the system by using a treadmill in extensive exercise mode, the user's pulse rate may increase over a threshold value (e.g., 100 beats per minute), which may trigger the system to lower the temperature of the thermostat 816 (e.g., from 70° to 60°). In example case 803, when the user 814 interacts with the system by stopping use of the treadmill and having the user's pulse rate return to normal, then the system may reset to the thermostat 816 back to its original temperature (e.g., 70°). In example case 804, the system may alert users that the stove 818 may be left on when detecting a high temperature reading at thermostat 820 in the kitchen and/or a high air conditioner load for the kitchen.

Figure 9:
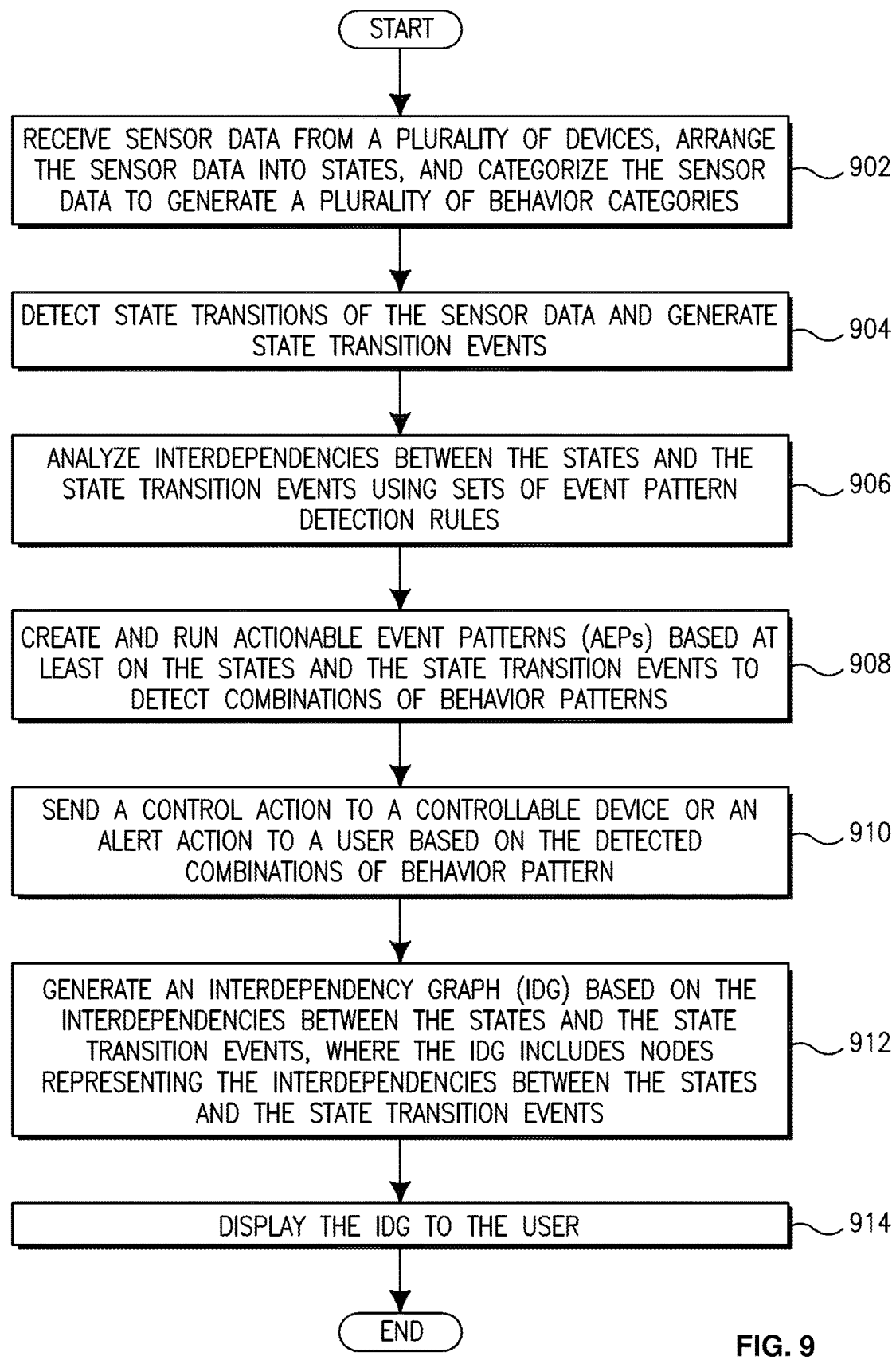
FIG. 9 is a flow chart of an example cooperative IoT action management procedure.

FIG. 9 is a flow chart of an example cooperative IoT action management procedure 900. The elements of procedure 900 may be performed by a cooperative IoT action management system, such as cooperative IoT action management system 400 shown in FIG. 4, and any of the components therein (e.g., user behavior model profiler 418, environment IoT behavior model profiler 408, and cooperative IoT action control manager 414 in FIG. 4). Not all the elements of procedure 900 may be performed, and procedure 900 may include any of the procedures or techniques described herein.

At 902, sensor data may be received from a plurality of devices, arranged into states, and categorized to generate a plurality of behavior categories, as may be done by a behavior model profiler. At 904, state transitions of the sensor data may be detected to generate state transition events. At 906, interdependencies between the states and the state transition events may be analyzed using sets of event pattern detection rules. At 908, AEPs may be created and run based at least on the states and the state transition events to detect combinations of behavior patterns. At 910, a control action may be sent to a controllable device and/or an alert action may be sent to a user based on the detected combinations of behavior pattern. At 912, an IDG may be generated based on the interdependencies between the states and the state transition events, where the IDG may include nodes representing the states and links between the nodes representing the interdependencies between the states and the state transition events. At 914, the IDG may be displayed to the user. As an example, the IDG information may display nodes and links from the IDG visually to the user. For example, the visual display may take a form similar to that of FIG. 7. As a second example, IDG information may be displayed in a floor plan, spatial map, or any other visual representation to depict locations of devices and objects. Links that represent significant interdependencies between devices, states of devices, state transitions of devices, and/or the like may be displayed on the floor plan, spatial map, or other visual representation. For example, the display may take a form similar to that of FIG. 8.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A server for managing a plurality of Internet of Things (IoT) devices comprising:
a transceiver;
a processor coupled to the transceiver, wherein the transceiver and the processor are configured to receive sensor data from the plurality of IoT devices; the processor being further configured to:
detect state transitions for each of the plurality of IoT devices from the sensor data and identify state transition events from the detected state transitions;
analyze interdependencies between the state transitions and the state transition events between a first device of the plurality of IoT devices and a second device of the plurality of IoT devices, wherein the first device is associated with a first location and the second device is associated with a second location; and
generate a visual environment depicting a link between the first device and the second device overtop of a virtual map that visually displays an area where the first device and the second device are located, the link including an interdependency value and representing an interdependency between states; and
a display coupled to the processor, wherein the display is configured to display a user interface that contains the visual environment.

2. The server of claim 1, wherein the sensor data includes user behavior sensor data and environment behavior sensor data.

3. The server of claim 1, wherein the virtual map includes an indication of an alert regarding the state transition events.

4. The server of claim 1, wherein the virtual map includes a notification to take a recommended course of action relating to the second device.

5. The server of claim 1, wherein the virtual map includes a floor plan and the area is indoors.

6. The server of claim 1, the processor further configured to identify a plurality of behavior patterns based on the analysis of interdependencies.

7. The server of claim 6, the transceiver and processor further configured to send a control instruction to the second device based on one or more combinations of the plurality of behavior patterns.

8. A method for managing a plurality of Internet of Things (IoT) devices:
receiving sensor data from the plurality of IoT devices;
detecting state transitions for each of the plurality of IoT devices from the sensor data and identifying state transition events from the detected state transitions;
analyzing interdependencies between the state transitions and the state transition events between a first device of the plurality of IoT devices and a second device of the plurality of IoT devices, wherein the first device is associated with a first location and the second device is associated with a second location;
generating a visual environment depicting a link between the first device and the second device overtop of a virtual map that visually displays an area where the first device and the second device are located, the link including an interdependency value and representing an interdependency between states; and
displaying the visual environment via a user interface.

9. The method of claim 8, wherein the sensor data includes user behavior sensor data and environment behavior sensor data.

10. The method of claim 8, wherein the virtual map includes an indication of an alert regarding the state transition events.

11. The method of claim 8, wherein the virtual map includes a notification to take a recommended course of action relating to the second device.

12. The method of claim 8, wherein the virtual map includes a floor plan and the area is indoors.

13. The method of claim 8, further comprising identifying a plurality of behavior patterns based on the analysis of interdependencies.

14. The method of claim 13, further comprising coordinating control of the second device based on one or more combinations of the plurality of behavior patterns.

15. The server of claim 1, wherein the first device reports a first device location, and the first device location is used to determine the area of the first device on the virtual map.

16. The method of claim 8, wherein the first device reports a first device location, and the first device location is used to determine the area of the first device on the virtual map.

17. The server of claim 1, wherein a location of the first device is manually configured, and the first device location is used to determine the area of the first device on the virtual map.

18. The method of claim 8, wherein a location of the first device is manually configured, and the first device location is used to determine the area of the first device on the virtual map.

19. The server of claim 1, wherein the user interface is a heads mounted display worn by the user and operatively connected to the server.

20. The method of claim 8, wherein the user interface is a heads mounted display worn by the user.

* * * * *